April 7, 1964  D. J. REED  3,128,216
METHOD AND APPARATUS FOR MAKING FIBER REINFORCED PLASTIC PIPE
Filed April 20, 1959  12 Sheets-Sheet 1

INVENTOR.
DANIEL J. REED
BY Andrus + Starke
Attorneys

April 7, 1964 D. J. REED 3,128,216
METHOD AND APPARATUS FOR MAKING FIBER REINFORCED PLASTIC PIPE
Filed April 20, 1959 12 Sheets-Sheet 2

INVENTOR.
DANIEL J. REED
BY
Attorneys

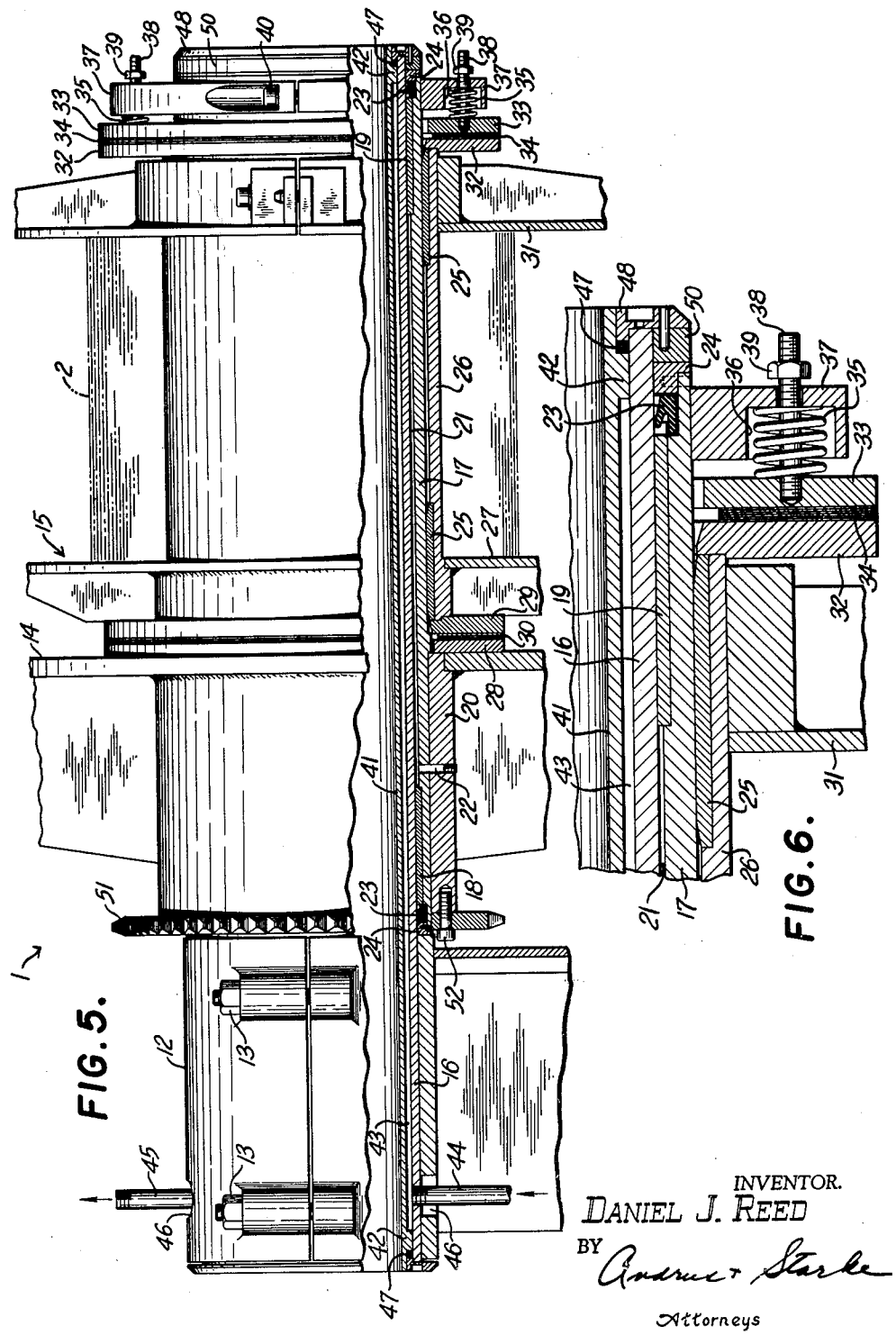

April 7, 1964  D. J. REED  3,128,216
METHOD AND APPARATUS FOR MAKING FIBER REINFORCED PLASTIC PIPE
Filed April 20, 1959  12 Sheets-Sheet 4

INVENTOR.
DANIEL J. REED
BY Andrus + Starke
Attorneys

INVENTOR.
DANIEL J. REED
BY Anerus & Starke
Attorneys

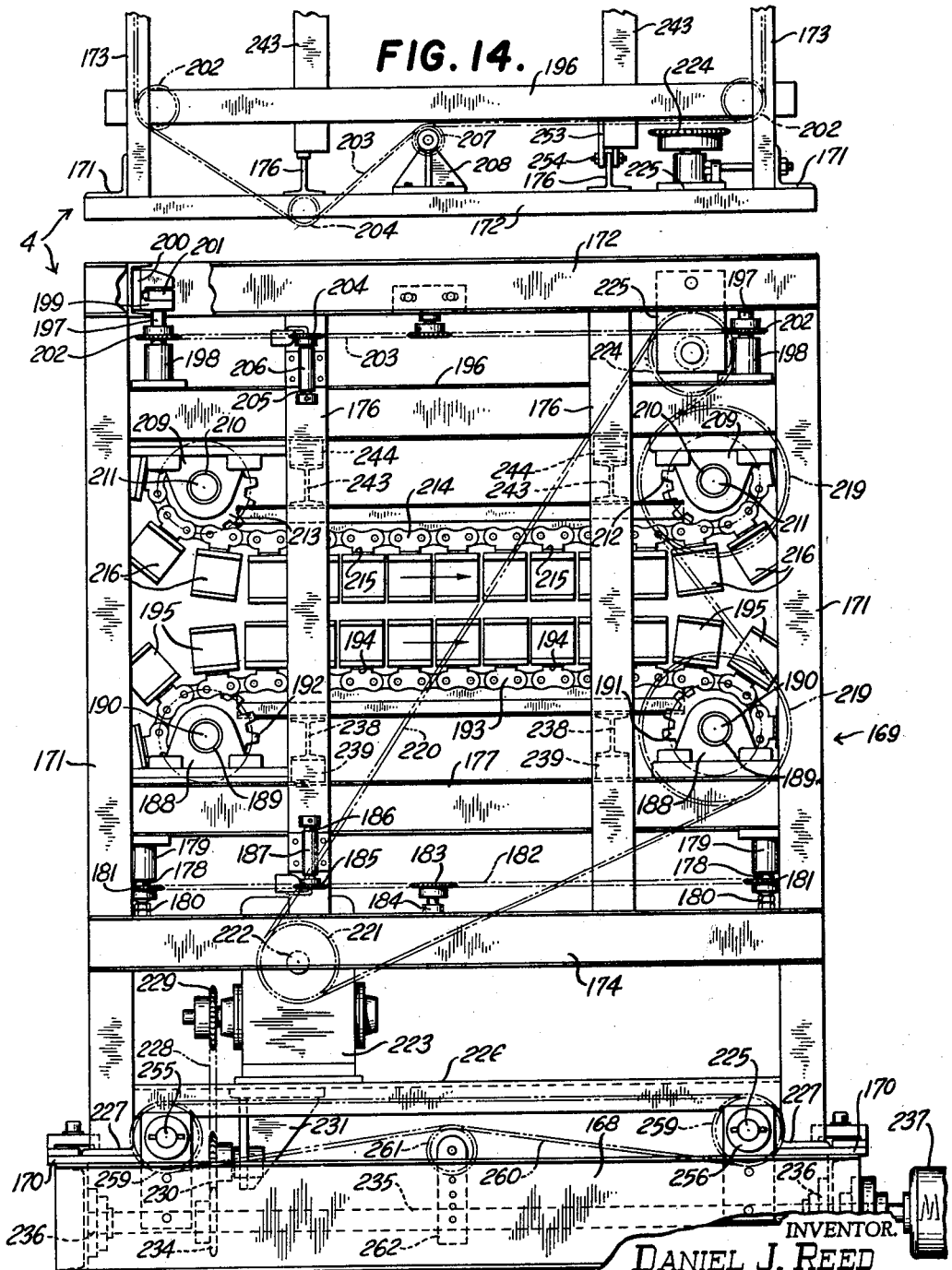

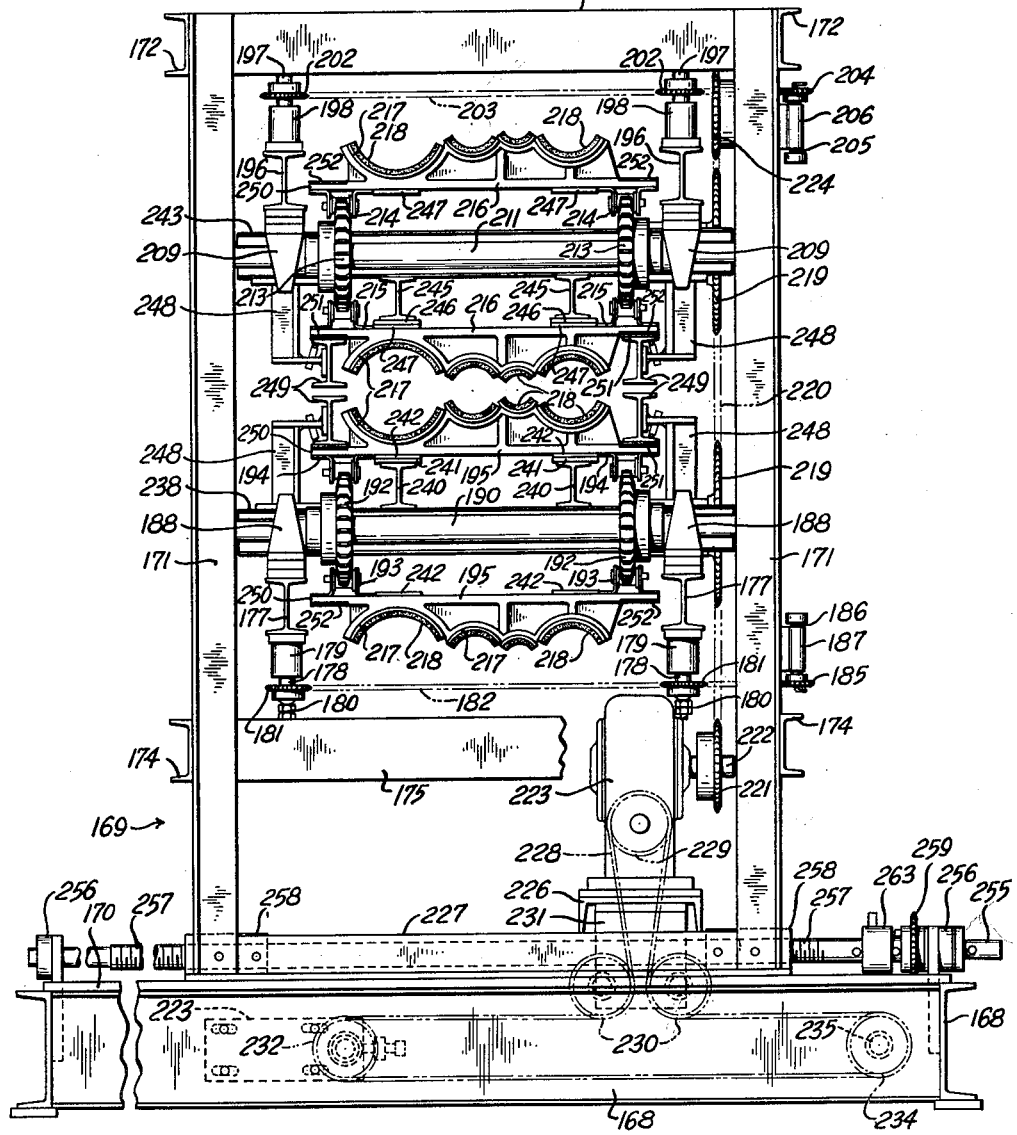

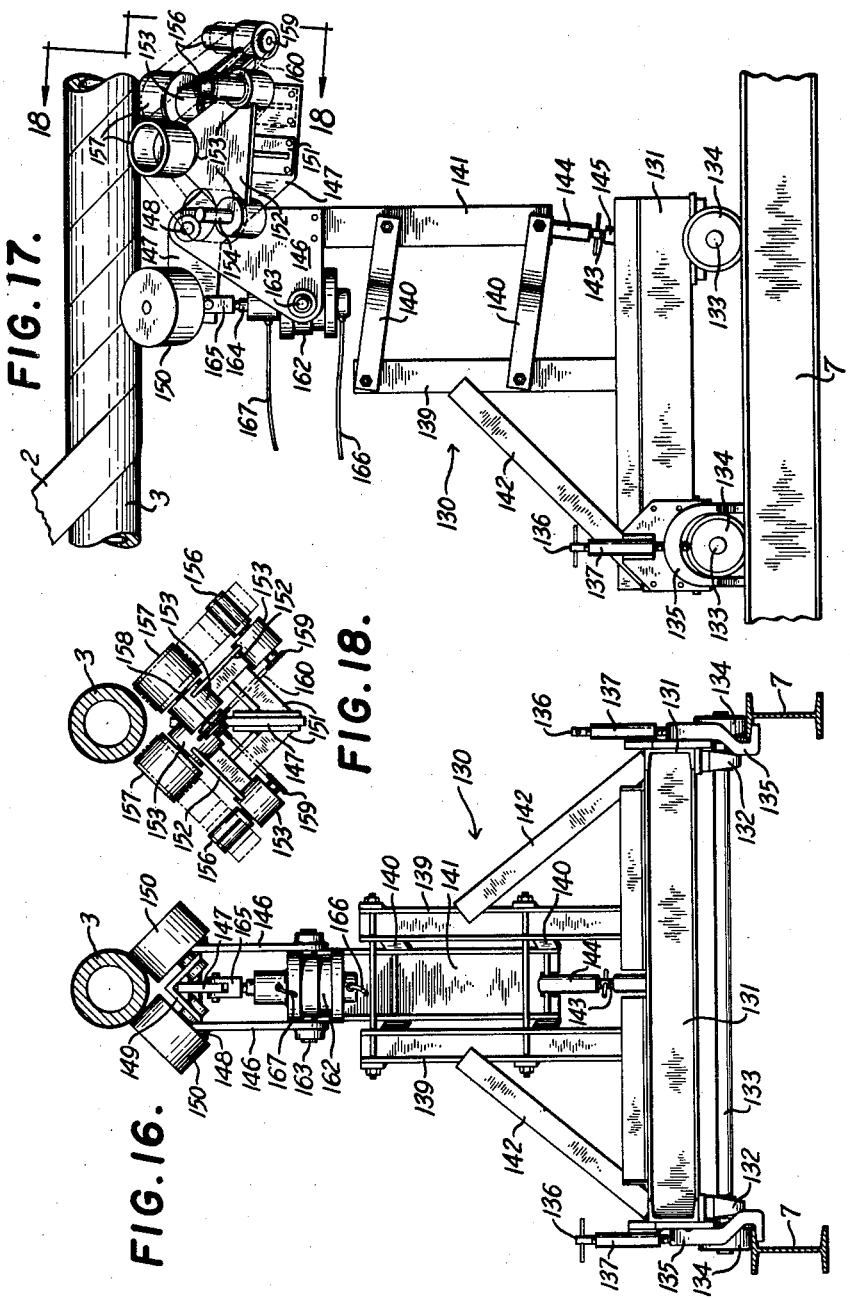

April 7, 1964 D. J. REED 3,128,216
METHOD AND APPARATUS FOR MAKING FIBER REINFORCED PLASTIC PIPE
Filed April 20, 1959 12 Sheets-Sheet 9

INVENTOR.
DANIEL J. REED
BY
Attorneys

April 7, 1964  D. J. REED  3,128,216
METHOD AND APPARATUS FOR MAKING FIBER REINFORCED PLASTIC PIPE
Filed April 20, 1959  12 Sheets-Sheet 10

INVENTOR.
DANIEL J. REED
BY
Andrus + Starke
Attorneys

INVENTOR.
DANIEL J. REED

United States Patent Office 3,128,216
Patented Apr. 7, 1964

3,128,216
METHOD AND APPARATUS FOR MAKING FIBER REINFORCED PLASTIC PIPE
Daniel J. Reed, Milwaukee, Wis., assignor to A. O. Smith Corporation, Milwaukee, Wis., a corporation of New York
Filed Apr. 20, 1959, Ser. No. 807,664
32 Claims. (Cl. 156—184)

This invention relates to an apparatus for fabricating reinforced plastic pipe.

Recently, there has been increased activity in the manufacture and use of fiber reinforced plastic pipe due to the lightweight and corrosion resistant properties of the plastic pipe. Pipe of this type generally consists of a matrix of a thermosetting or thermoplastic resin reinforced with fibrous materials, such as glass, mineral, synthetic or vegetable fibers, either in the form of continuous filaments or fabric. To fabricate a pipe or tubular article of this kind the reinforcing material is impregnated with the resin and wound in a generally helical pattern about a cylindrical mandrel in a number of superimposed layers to form the tubular article. After winding the reinforcing material on the mandrel to obtain the desired wall thickness, the resin is cured to produce the completed tubular article.

One common method of fabricating a reinforced plastic pipe is to rotate the mandrel longitudinally while reciprocating the winding head along the mandrel to wind a strand of reinforcing material in a double helical pattern. However, this method is most practical for winding given lengths of pipe and is not particularly adaptable for a continuous process. Furthermore, the use of a rotating mandrel, particularly when winding long lengths of pipe presents difficulties in that the mandrel will whip in the center and vibrate, which has an adverse effect on the pipe being produced. In addition, with the use of a reciprocating head, difficulties are encountered in reversing the strand on the mandrel and maintaining the strand at the ends of the pipe length in its proper orientation.

In the past, the fiber reinforced pipe has also been fabricated by employing a series of rotating heads which contain the fibrous reinforcing material and rotate about the mandrel to wind the strand onto the mandrel in the helical pattern. However, with the use of a plurality of rotating heads a balancing problem results as the reinforcing material is used during the winding operation.

The present invention is directed to an apparatus for fabricating fiber reinforced resin pipe in which the fiber strand or tape formed of substantially continuous filaments is impregnated with resin and contained on a spool or reel which is mounted coaxially with the mandrel. As the mandrel is advanced longitudinally through a series of the spools, each alternate spool is rotated in an opposite direction so that the tape will be alternately applied in opposite directions on the mandrel and provide a double helical winding pattern. After the desired number of layers of tape have been applied to the mandrel to provide the required wall thickness for the pipe, the resin is cured and the cured resin pipe is subsequently stripped from the mandrel.

The fibrous tape is impregnated with a resin which is in a solid state when the tape is contained on the spool or reel. The tape is wound onto the mandrel which is heated to a temperature sufficient to melt and provide a homogeneous mass to bind the fibers of the various layers of tape together into an integral structure.

The present invention also provides a novel arrangement for supporting the mandrel at various locations throughout its length. As the resin impregnated tape is heated after application to the mandrel, it is not practical to support the mandrel in the locations of the melted resin, for the resin in the melted state is sticky or tacky. Therefore, a removable support roller is provided immediately adjacent the position of application of the tape to the mandrel and at this location the tape is cool and the resin is still in the solid state to thereby provide a nontacky supporting surface for the support roller.

An auxiliary means is provided to temporarily support the mandrel in event of stoppage of the mandrel advancement. If for some reason the mandrel advancement is stopped or slowed down below a critical speed, a temporary support member is raised into contact with the mandrel and the support roller is withdrawn. This temporary support member is covered with a cellophane wrapper and when the mandrel movement is again started the temporary support is removed and the cellophane wrapper can be discarded.

The present apparatus is particularly adaptable for forming fiber glass reinforced plastic pipe in a continuous operation in which the mandrel is continually advanced through the series of rotating winding heads to wind the fibrous tape on the mandrel.

The present apparatus employs a fibrous tape impregnated with a solid type resin which is melted on application to a heated mandrel to provide a homogeneous mass and this results in a better impregnation of the individual fibers with the resin. The fibrous tape is contained on large spools which are mounted coaxially with the mandrel so that balancing problems are eliminated and the apparatus can operate at high speeds.

The double helical pattern in the completed pipe is readily obtained by having each alternate spool in the series rotate in opposite directions and thereby wind the tape in the opposite helical angle.

As the mandrel in the present apparatus is advanced longitudinally, but is not rotated, the mandrel will not whip in the center and the vibrational problems will be reduced.

Other objects and advantages will appear in the course of the following description.

The drawings illustrate the best mode presently contemplated of carrying out the invention.

In the drawings:

FIG. 5 is a fragmentary side elevation with parts broken awy in section and showing the structure of the disc and spool;

FIG. 6 is an enlarged vertical section showing the attachment of the spool to the stationary sleeve;

FIG. 13 is a side elevation of the mandrel feeding mechanism;

FIG. 14 is a fragmentary top view of the mandrel feeding mechanism;

FIG. 15 is an end view of the mandrel feeding mechanism;

FIG. 16 is an end view of the mandrel supporting structure;

FIG. 17 is a side elevation of the mandrel supporting structure;

FIG. 18 is a view taken along line 18—18 of FIG. 17;

Figure 1:
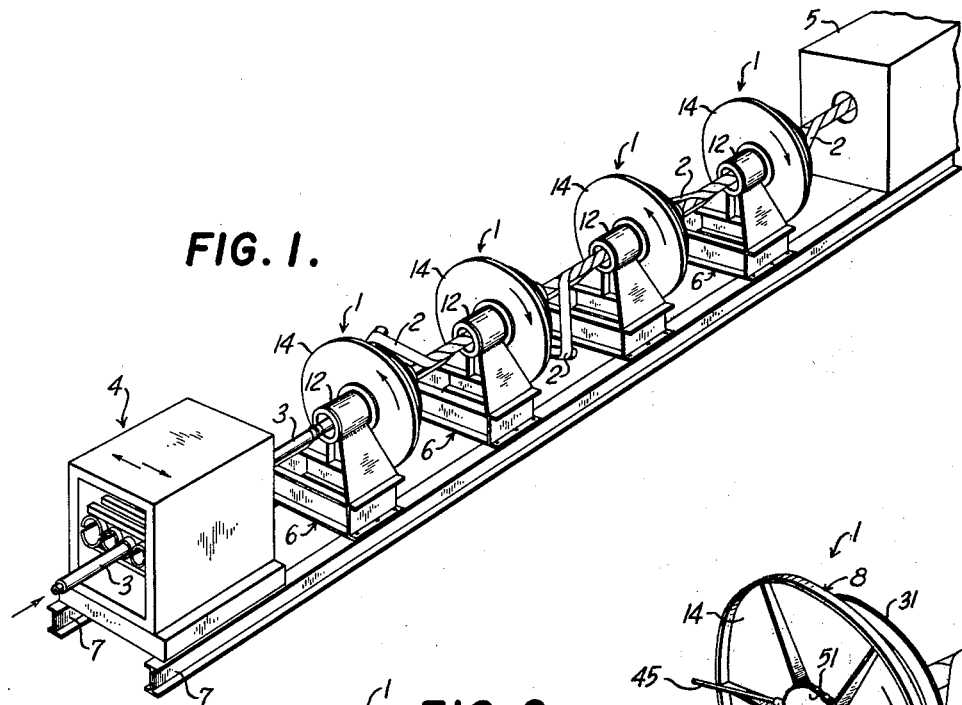
FIGURE 1 is a diagrammatic perspective view of the apparatus of the invention showing the feeding mechanism and a series of winding units with the drive mechanism for the winding units and the mandrel supporting structure being removed for clarity.

The drawings illustrate an apparatus for the continuous fabrication of fiber reinforced plastic pipe and includes a series of spaced winding units 1 adapted to wind a fibrous, resin-impregnated tape 2 on a longitudinally advancing segmented mandrel 3. The mandrel is advanced through the winding units 1 by a feed mechanism 4, and a curing oven 5 is located in alignment with the winding units and serves to cure the resin and provide an integral pipe. After curing, the pipe is cut into desired lengths at the mandrel joints and stripped from the mandrel.

Each of the winding units 1 includes a frame 6 which rests on beams 7 and supports a rotating head 8 mounted coaxially with the mandrel 3.

The frame 6 includes a pair of transverse beams 9 and a pair of end beams 10 which are joined together and supported by the beams 7. A pair of side plates 11 extend upwardly from the beams 9 and 10 and support a split hub 12. The hub is formed in two half sections which are joined together by bolts 13.

Each rotating head 8 is rotatably supported by the hub 12 and includes, generally, a large circular disc 14 and a spool 15 which contains the tape 2 to be wound on the mandrel 3. The disc 14 and spool 15 are supported from the frame 6 by means of a shaft 16 which is secured to the inner surface of the hub 12 and extends outwardly therefrom in a direction forwardly of the direction of movement of the mandrel 3. An annular supporting sleeve 17 is located forwardly of the hub 12 and is journaled on the shaft 16 by bearings 18 and 19.

The support sleeve 17 is adapted to be rotated on the shaft 16 and the disc 14 is secured to the sleeve by the attachment of annular flange 20 to the outer surface of the sleeve so that the disc 14 rotates with the sleeve.

To lubricate the bearings 18 and 19, the support sleeve 17 is spaced outwardly from the shaft 16 to provide an annular space 21 therebetween. Suitable aligned openings 22 are provided in the flange 20 of disc 14 and in the support sleeve 17 to introduce a lubricating fluid into the space 21 to lubricate the bearings. The ends of the annular space 21 are sealed by suitable seals 23, and thrust washers 24 are located outwardly of the seals and are secured to the sleeve 17.

The spool 15 is journaled on the sleeve 17 by a pair of bearings 25. With this construction the spool 15 can rotate relative to the sleeve 17 and disc 14 and thereby permit the spool to rotate at speeds either faster or slower than the disc 14, depending on the direction the tape is unwound from the spool and wound onto the mandrel 3.

The spool 15 or package means, which contains the tape 2 in coil form, includes a hub 26 and a rear end plate 27 which is welded to the end portion of hub 26. A frictional contact is employed between the disc 14 and the spool 15 by means of complementary friction discs 28 and 29 to prevent free rotation of the spool. Disc 28 is secured to the forward face of disc 14 and rotates therewith, while disc 29 is secured to the end of hub 26 of spool 15. The disc 29 also serves as a bearing retainer for the rear bearing 25. The discs 28 and 29 are separated by wear pad 30 secured to disc 28.

The tape 2 is contained on the hub 26 by a split forward end member 31 which is formed in two halves and clamped on the hub 26 of the spool. The position of the end member is adjustable axially on the hub 26 depending on the tape width.

To retain the spool 15 on the sleeve 17, a friction disc 32 is secured to the forward end of the spool hub 26, and a complementary disc 33 is spring biased against the disc 32. A suitable friction pad 34 is disposed between the two relatively moving discs 32 and 33.

The outer disc 33 is biased inwardly to maintain the spool in position on the sleeve 17 by a series of springs 35 which are contained within circularly spaced recesses 36 formed in split collar 37. Springs 35 are disposed around rods 38 which extend through suitable openings in the collar 37 and are threadedly engaged with nuts 39. The springs 35 serve to bias or urge the outer disc 33 inwardly against the inner disc 32 and prevent free rotation of the spool on the sleeve 17. By suitable adjustment of the nuts 39, the tension of the springs 35 on the spool can be varied so as to change the degree of freedom of rotation of the spool.

The two halves of the split collar 37 are adapted to be secured together by bolts 40.

To remove an empty spool 15 from the winding unit, the bolts 40 are removed and the split collar is withdrawn from the sleeve 17. After removal of the collar 37, the disc 33 is removed and the hub 26 and rear end plate 27 can then be withdrawn from the supporting sleeve 17.

With the present spool construction various widths of tape can be employed without changing the construction of the spool itself. As the end member 31 is formed in two halves and can be clamped at any location along the length of the spool hub 26, tapes of various widths can be readily accommodated. As the spool 15 has a large diameter so that winding can be carried on for long periods; the resin on the inner turns or convolutions of the coiled tape on the spool may be heated by radiation from the mandrel to a temperature sufficiently high to cure the resin. To eliminate this possibility a cooling system is provided for each winding unit. A liner 41 is disposed within the shaft 16 and is spaced from the shaft by means of external end flanges 42 to provide a chamber 43 therebetween. Chamber 43 serves as a cooling passage, and a cooling media such as water is introduced into the chamber 43 through an inlet tube 44 which is threadedly engaged with an opening in the shaft 16. A cooling fluid is withdrawn from the chamber 43 through a tube 45, similar to tube 44 which is also threadedly engaged within an opening in the shaft 16. The tubes 44 and 45 pass through suitable openings 46 in the hub 12.

To seal the chamber 43 an O-ring seal 47 is disposed within each end of the shaft 16 outwardly of flanges 42 and is retained in place by ring 48.

The retaining ring 48 at the forward end of the winding unit is secured against rotation to a ring 50 by means of a suitable pin.

As the resin impregnated tape is applied to a heated mandrel, heat from the mandrel melts the resin to form a homogeneous mass. The cooling system prevents heat from being transferred to the winding unit, and as the winding unit remains cool there is no danger of heat accumulating therein and eventually heating the resin associated with the tape wound on the spool to a degree to cause a complete cure of the resin. If the inner turns or convolutions of the tape on the spool are continually subjected to heat from the mandrel, the resin on these inner turns may fully cure or polymerize to a solid infusible state and thereby prevent the unwinding of these turns from the spool.

To rotate the disc 14, a sprocket 51 is secured to the hub 20 of disc 14 by means of bolts 52. The sprocket 51 is connected to a sprocket 53 on shaft 54, by means of chain 55. The shaft 54 is located beneath the frame 6 and is suitably journaled within bearing brackets 56 secured to the lower portion of the frame.

The shaft 54 is driven by means of a motor 57 acting through a speed reducing unit 58. The output shaft of the speed reducing unit carries a sprocket 59 which is connected by chain 60 to a sprocket 61 on the shaft 54. With this arrangement, the rotation of the motor drive shaft serves to rotate the disc about the axis of mandrel 3.

It is contemplated that the disc 14 of each alternate winding unit 1 will rotate in the opposite direction, as shown in FIGURE 1, to wind the tape on the mandrel in a double helical pattern. However, in some situations a single helix pattern may be desired, in which case all of the discs will rotate in the same direction.

The tape, which is contained on spool 15 and is wound on the mandrel, consists preferably of unidirectional fibers impregnated with a solid, uncured thermosetting resin. The fibers, which are in the form of long, continuous, generally parallel filaments, can take the form of glass fibers, synthetic fibers, mineral fibers, vegetable fibers or the like.

The resin to be employed may be any of the conventional thermosetting resins such as a polyester resin in which at least one of the reactants contains an unsaturated double bond in an aliphatic group. For example the unsaturated bond may be in the polybasic acid component such as when maleic acid or anhydride is reacted with a polyhydric alcohol such as glycerol, ethylene glycol, diethylene glycol, propylene glycol, sorbitol, mannitol, polyethylene glycol and the like. In addition other thermosetting resins of the diallylphthallate, epoxide, furane, or thermoplastic resins such as vinyl resins and the like may also be used to impregnate the fibrous materials.

While the invention is particularly adaptable to winding resin impregnated, unidirectional fibers on the mandrel in a helical pattern, it is contemplated that any form of tape or strip material may be employed in the present apparatus.

Figure 10:
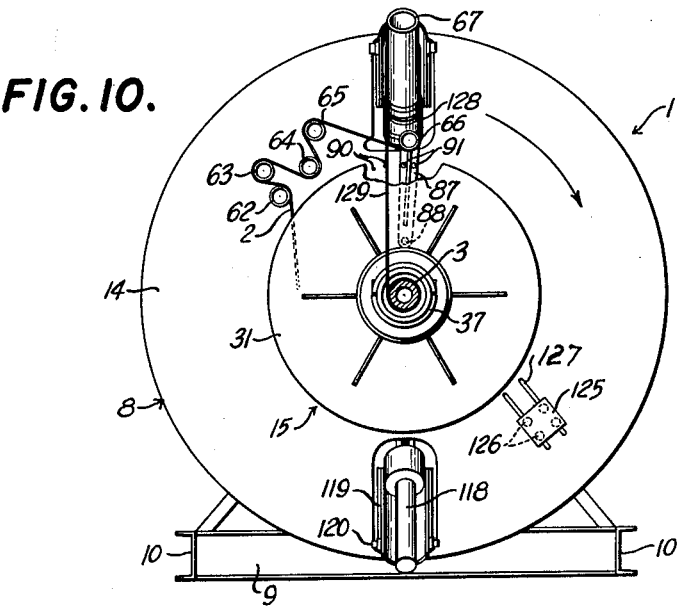
FIG. 10 is an end view of FIG. 3 and showing the forward surface of the disc.
Figures 11, 12:
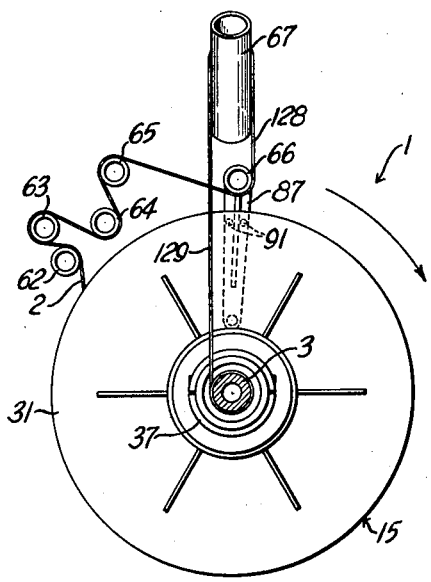
FIG. 11 is a diagrammatic view similar to FIG. 10 with parts removed and showing the roller arrangement when the disc is rotating in the direction of the arrow.
FIG. 12 is a view similar to FIG. 11 showing the roller arrangement when the disc is rotating in the direction of the arrow.
Figure 19:
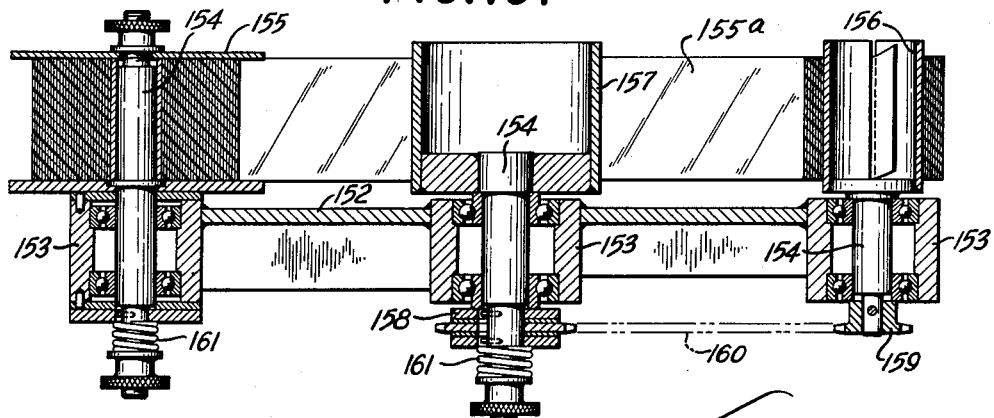
FIG. 19 is a sectional view of the mechanism for holding the strip of parting material.

As best shown in FIGS. 10 through 12, the tape is guided onto the mandrel by a series of rollers which are secured to the face of disc 14. The tape, leaving the spool 15, passes progressively over an idler roller 62, friction roller 63, idler roller 64, friction roller 65, guide roller 66 and a distribution roller 67 which guides the tape onto the mandrel with the proper helix angle.

The friction rollers 63 and 65 are identical in structure and include a stub shaft 68 which is secured to the inner end of the roller and is journaled within a bearing assembly 69 housed in closure 70. The closure 70 is secured within an annular plate 71 which in turn is secured within an opening in the disc 14.

The bearing assembly 69 is retained in position within the housing 70 by a lock nut assembly 72 which is threadedly engaged with a threaded central portion of stub shaft 68.

To maintain the tape in a taut condition, the rollers 63 and 65 are prevented from rotating freely by a frictional disc mechanism which is associated with the outer end of the shaft 68. The frictional mechanism includes a pair of discs 73 which are keyed to the outer end of the shaft 68 and are separated from a pair of complementary backing discs 74 by friction rings 75 which are disposed between the complementary discs 73 and 74. The friction rings 75 are secured to studs 76 which extend outwardly from the annular support plate 71. The studs 76 support and prevent rotation of the rings 75 while the discs 73 and 74 rotate with the shaft 68.

The pressure between the rings 75 and the respective discs 73 and 74 can be varied by means of a spring assembly including a plurality of springs 78 which are disposed about rods 79. One end of each spring 78 is disposed within the bottom of a recess formed in an outer cap 80, while the other end of the spring bears against a series of friction pads 81 to apply a force to the rings 75. The outer ends of the rods 79 are pivotally engaged with nuts 82 and by threading the nuts down on the rods 79, the pressure on the rings 75 is selectively varied to provide any degree of frictional resistance to the free rotation of the rollers 63 and 65.

The idler rollers 62 and 64 are similar in construction to friction rollers 63 and 65 with the exception that the idler rollers do not contain the friction disc arrangement. In the case of the idler rollers, a suitable retaining nut is threaded onto the end of the stub shaft 60 to retain the shaft 68 within the bearing assembly 69.

Figure 9:
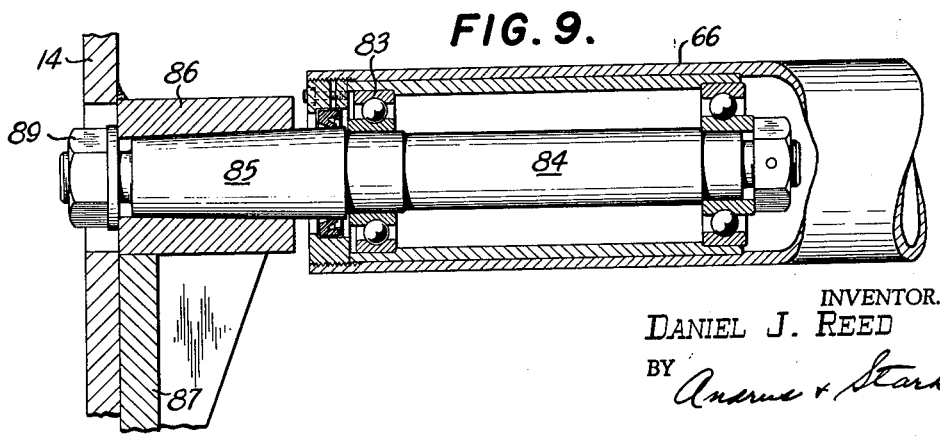
FIG. 9 is a fragmentary side elevation with parts broken away in section of the pivotable guide roller.

As best shown in FIG. 9 the inner end of the roller 66 houses a bearing assembly 83 in which shaft 84 is journaled. The tapered outer end 85 of shaft 84 is received within a complementary tapered opening in boss 86. The boss 86 is carried by an elongated bracket 87 pivotally secured to the face of the disc 14 by a pin 88. The shaft 84 is retained within the boss 86 by a nut 89 which is threadedly engaged to the end of the shaft.

In order to vary the location of the guide roller 66 with a respect to the distribution roller 67, a series of spaced holes 90 are provided in the disc 14 and a stud 91 is adapted to extend through a suitable opening in the bracket 87 and threadedly engage one of the holes 90. As best shown in FIGS. 11 and 12, the position of the guide roller 66 is changed with respect to the distribution roller 67 when the disc 14 is rotated in opposite directions, or it can be varied if a distribution roller of different diameter is employed. By pivoting the bracket 87, the position of the guide roller 66 can be conveniently changed, as desired.

The distribution roller 67, which is adapted to guide the tape or strip from the guide roller 66 onto the mandrel 3, is provided with a tapered stub shaft 92 which is journaled within a bearing assembly 93 housed in bearing housing 94. The bearing assembly 93 is retained within the housing 94 by means of a retaining ring 95, and a lock nut assembly 96 is threaded onto the end of the shaft 92 and retained thereon by a nut 97.

The upper half of the distribution roller 67 is covered by a generally semi-cylindrical shield 98 which extends substantially the length of the roller 67 and shaft 92. The inner end of the shield 98 is secured to the bearing housing 94 by bolts 99 which extend through aligned openings in the flanges of the shield and the bearing housing, respectively.

To pivot the distribution roller and thereby vary the helix angle of winding of the tape on the mandrel, the shield 98 is trunnioned at 100 within a pair of arms 101 extending outwardly from the face of the disc 14. The disc 14 is provided with a suitable opening through which the distribution roller 67 and shield 98 extend. With this construction, the distribution roller and shield can be pivoted about trunnion 100 to change the angle of the axis of the distribution roller with respect to the axis of the mandrel and thereby change the helix angle of winding on the mandrel.

Figure 3:
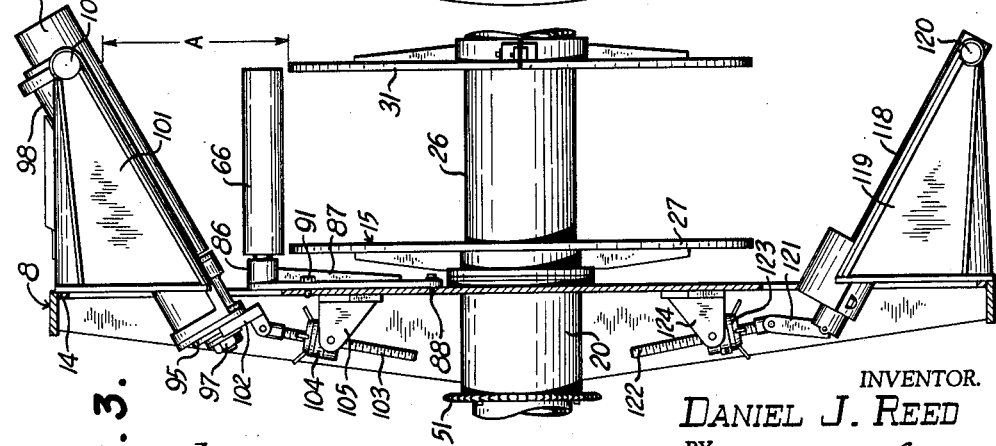
FIG. 3 is a side elevation of a winding unit showing the rotating disc and the spool.
Figure 7:
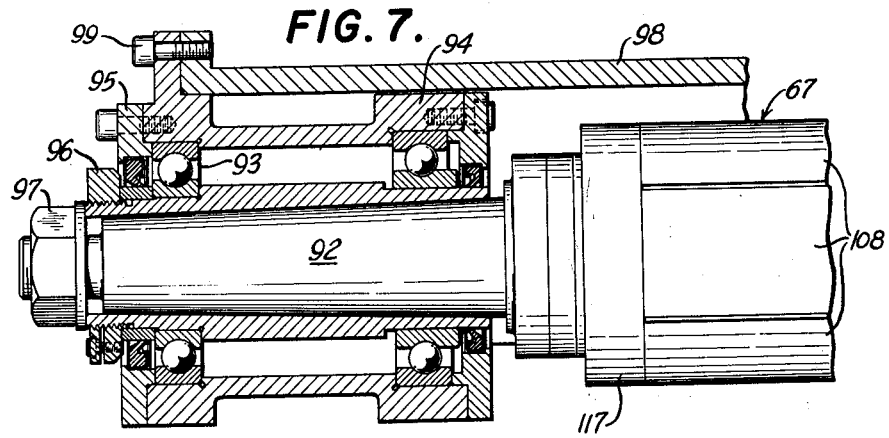
FIG. 7 is a fragmentary side elevation with parts broken away in section and showing the supporting structure for the distributing roller.
Figure 8:
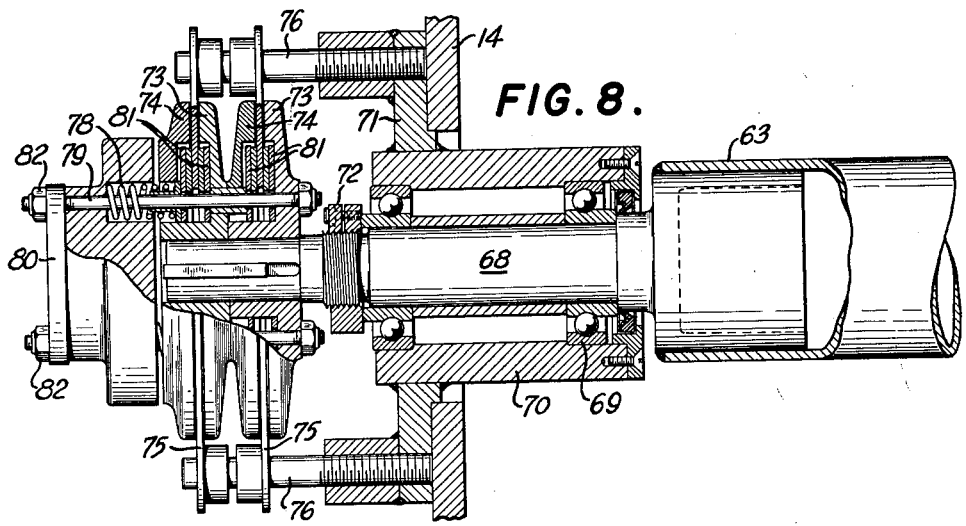
FIG. 8 is a fragmentary side elevation with parts being broken away in section of the tensioning rollers.

The feature of pivoting the distribution roller 67 at the outer end rather than at the inner end adjacent the disc 14 provides substantial advantages. The pivotal connection of trunnion 100 results in a substantial space saving in that the diameter of the disc can be reduced over a system in which the distribution roller is pivoted at its inner end adjacent the disc. More specifically it is necessary to provide a given amount of clearance between the distribution roller 67 and the forward edge of the spool 15 in order that the tape may pass to the mandrel. To provide the necessary clearance, indicated by A in FIG. 3, the distribution roller is pivoted about trunnion 100 so that the distance between trunnion 100 and the edge of the spool will remain constant when the distribution roller 67 is pivoted. If the distribution roller were to be pivoted adjacent the disc 14, the point of pivotal attachment would be radially outward from the trunnion 100 in order to obtain the necessary clearance A, thereby resulting in the diameter of the disc 14 being substantially increased.

The distribution roller 67 is pivoted by a mechanism which includes a bracket 102 secured to the inner end of the shield 98. A rod 103 is pivotally connected to the bracket 102 and is threadedly engaged within a nut 104 carried by bracket 105. By threading the nut 104 on rod 103, the distribution roller is pivoted about trunnion 100 to vary the helix angle of the winding pattern.

Figure 23:
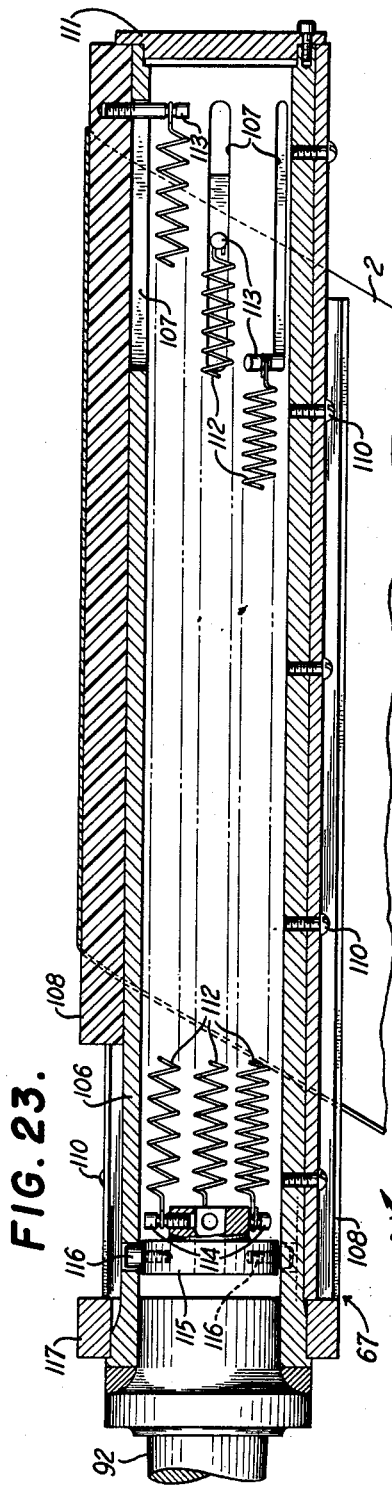
FIG. 23 is a view taken along line 23—23 of FIG. 22.
Figure 22:
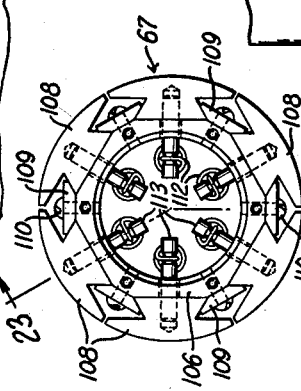
FIG. 22 is an end view of the distribution roller.

As the distribution roller 67 is disposed at an angle with respect to the axis of the spool 15 and mandrel 3, the tape 2, passing over the distribution roller, will tend not only to rotate the roller but will slide longitudinally along the roller surface. To prevent the frictional resistance due to the sliding of the tape along the surface of the roller, a mechanism is provided to permit the surface of the roller 67 not only to rotate but to move longitudinally with the tape as the same passes over the roller. As best shown in FIGS. 22 and 23 the roller 67 comprises an inner polygonal-shaped member 106 which is secured to the shaft 92. The outer end portion of member 106 is provided with a series of longitudinally extending slots 107.

The member 106 supports a series of slidable keys or segments 108 which are formed with a length less than that of the member 106 and are adapted to slide longitudinally along the surface of the member 106. To retain the keys 108 on the surface of the inner member 106, a series of retaining bars 109 are secured to the surface of the member 106 by screws 110. The retaining bars 109 are provided with outwardly diverging side edges which complement the tapered side walls of the keys and prevent the keys from moving radially.

The keys 108 are retained on the inner member 106 by an end cap 111 which is suitably secured by screws to the outer end of the member 106.

Each of the keys 108 is biased inwardly toward the inner end of the roller by a spring 112. The outer end of each spring 112 is secured to a pin 113 connected to the outer end of the respective keys 108, while the inner end of each spring 112 is secured to one of a series of circumferentially spaced pins 114 secured to block 115. The block 115 is suitably secured within the hollow interior of member 106 by screws 116. The springs 112 urge the keys 108 inwardly toward the block 115 and inward movement of the keys is limited by an annular stop 117 which is secured to the outer surface of the member 106. With this structure, the springs 112 normally bias the keys 108 inwardly toward the inner end of the roller. As the tape 2 passes over and rotates the roller, it engages a series of the keys 108 and moves the keys longitudinally outwardly against the force of springs 112 as the tape is moved over the roller. When the tape leaves the roller, the keys, which had supported the tape, are successively returned to their original inward position by the springs 112. This structure serves to permit the roller surface not only to rotate with the tape, but also to move longitudinally with the tape as the direction of the tape is changed and the same is wound onto the mandrel in a helical pattern.

As the disc 14 is adapted to rotate at high speeds, it is necessary to counterbalance the weight of the roller 67. An elongated member 118 is trunnioned within arms 119 at 120. The elongated member is provided with a size and weight distribution generally equal to that of the distribution roller 67 so that the position and angularity of the elongated member 118 may be adjusted to balance the position of the roller 67.

To vary the angle of the elongated member 118, a link 121 is secured to the outer end thereof and is pivotally connected to a threaded rod 122. A nut 123 is threadedly engaged with the rod 122 and is supported by a bracket 124. As in the case of the distribution roller, threading of the nut 123 on rod 122 will pivot the elongated member 118 about the trunnion 120 to vary the angle of the elongated member with respect to the axis of the mandrel.

A counterweight 125 is provided to balance the weight and position of the idler, friction and guide rollers 62, 63, 64, 65 and 66 and provide balanced rotation of the disc 14. The counterweight 125 is secured to the disc 14 by a series of bolts 126 which extend through slots 127 in the disc 14. By moving the bolts 126 within the slots, the position of the counterweight 125 can be varied to balance the weight of the idler, friction and guide rollers.

In order to prevent sagging or twisting of the tape 2 on one side of the mandrel and maintain a uniform tension on the tape throughout, the portion, indicated by 128, of the tape 2 approaching the distribution roller 67, and the portion 129 of the tape leaving the distribution roller should be located in parallel planes. This is best shown in FIGS. 11 and 12. In FIG. 11, the spool 15 is rotated in the clockwise direction and the roller 66 is positioned so that the peripheral edge of the roller (in the direction of rotation of disc 14) is in alignment with the corresponding edge of the distribution roller 67. Similarly, the peripheral edge of the distribution roller (in the direction away from the rotation of disc 14) is in alignment with the corresponding edge of the mandrel 3. This results in the tape in the areas 128 and 129 being located in parallel planes.

In FIG. 12, the disc 15 is rotated in a counterclockwise direction and the roller 66 is pivoted to provide the parallel tape areas 128 and 129. In this case, the trailing peripheral edge of the roller 66 (in the direction of disc rotation) is in alignment with the leading edge of the distribution roller 67 and the trailing edge of the roller 67 is in alignment with the trailing edge of the mandrel 3. Again, the portions of the tape, indicated by 128 and 129 are parallel planes, thereby insuring that the tape does not sag or twist and a uniform tension will be maintained on the tape throughout the winding operation. If the axis of distribution roller 67 is fixed with respect the axis of mandrel 3, the diameter of the distribution roller should be equal to the diameter of the mandrel to achieve the parallel relation between portions 128 and 129.

The mandrel 3 is supported at spaced intervals throughout its length by a series of support units 130, which are best shown in FIGS. 16 through 19. Each support unit 130 comprises a generally rectangular base platform 131 which is movably mounted on the longitudinal beams 7. The base 131 is provided with two pairs of depending brackets 132 which journal axle 133. Wheels 134 are attached to the ends of axles 133 and are adapted to ride on the upper surface of the beams 7.

To clamp the support unit 130 at any given location on the beams 7, a generally U-shaped clamp 135 is provided for each wheel. A rod 136 is threaded through a suitable opening in the upper end of each clamp 135 and bears against the periphery of the wheel. The upper end of each rod 136 is threadedly received within a sleeve 137 attached to the base 131 and by threading down the rod 136 within the sleeves 137, the wheels 134 are clamped against the beams 7, due to the hook-shaped lower portion of the clamps which engages the upper flanges of the beams.

Each base 131 supports a frame which includes a pair of upright members 139 which are joined by pivotable links 140 to the generally vertical beam 141. The uprights 139 are braced by diagonal members 142 which connect the uprights to the base 131.

Due to the pivotal connection of links 140, the beam 141 can move vertically with respect to the uprights 139. An adjustable stop is provided for the beam 141 by means of shaft 143 which is threadedly engaged with nut 144 attached to the lower end of beam 141. The lower end of the shaft bears against the stop 145 on base 131. By threading the shaft 143 with respect to the nut 144, the vertical position of beam 141 can be varied.

A pair of generally triangular plates 146 are attached to the upper end of beam 141 and an arm 147 is fulcrumed at 148 between the plates 146. An angle bracket 149 is secured to one end of the arm 147 and rotatably supports a pair of support rollers 150. During normal operation of the apparatus, the support rollers 150 are disposed in engagement wtih the mandrel 3, and serve to support the mandrel throughout its length. The rollers 150, being disposed at an angle to the horizontal, prevent lateral displacement of the mandrel as well as supporting the mandrel in longitudinal advancement.

Figure 2:
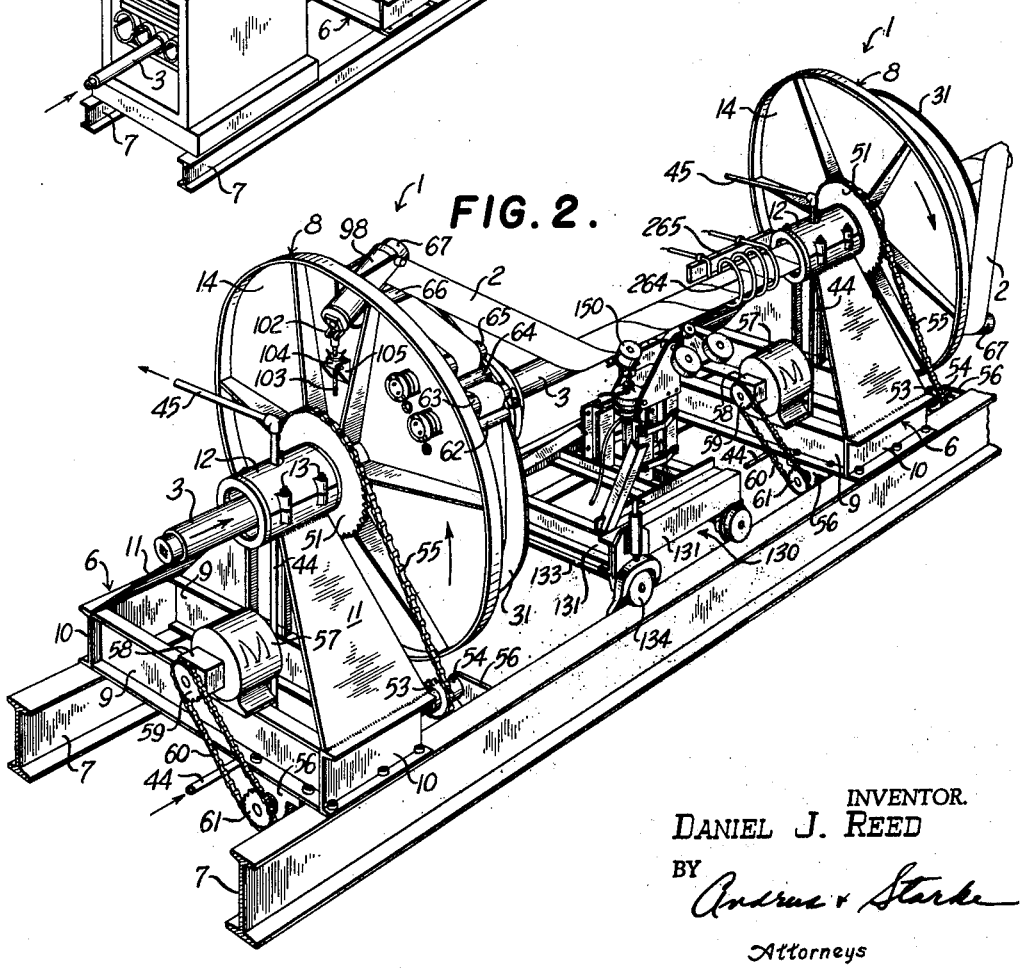
FIG. 2 is a perspective view of a winding unit and the mandrel support structure.
Figure 4:
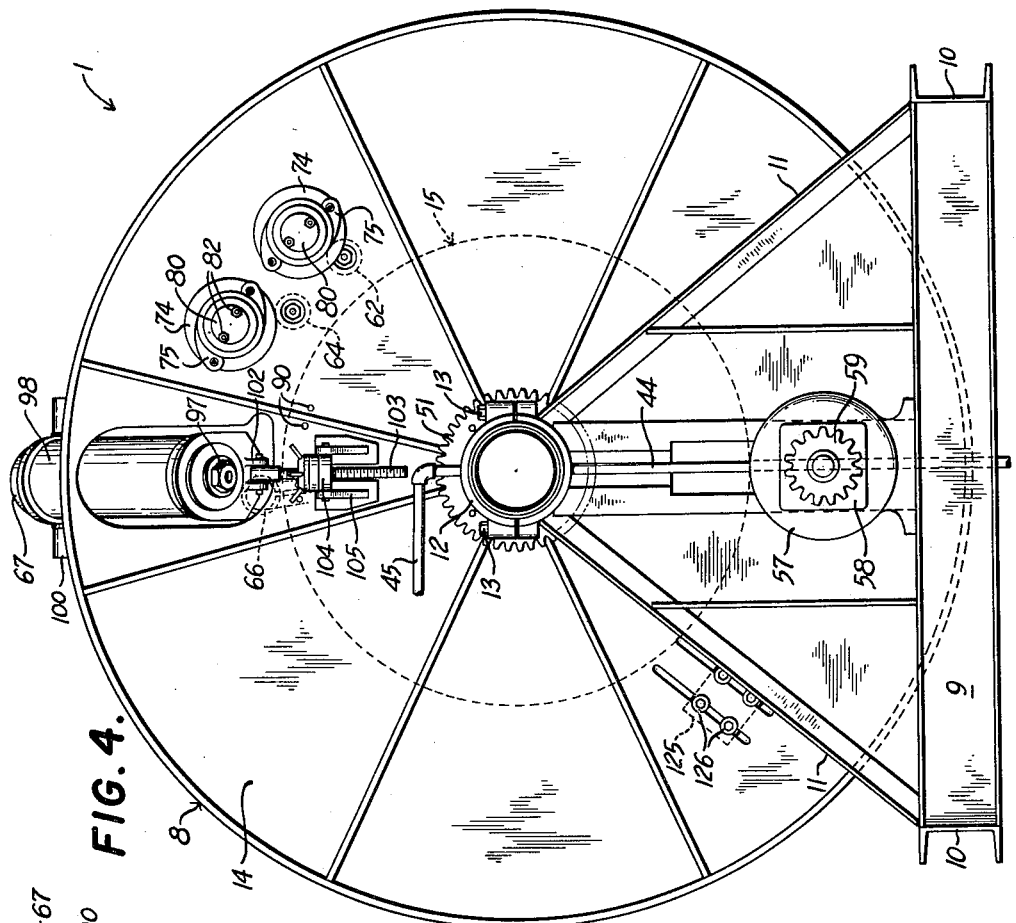
FIG. 4 is an end view of the structure shown in FIG. 3 and showing the rear surface of the disc.

As best seen in FIGS. 2 and 17, the support rollers 150 are located immediately forward (in the direction of mandrel advancement) of the point of application of the tape 2 to the mandrel. It is necessary that the support rollers be located in proximate relation to the point of application of the tape, for the tape with the solid resin, is applied to a heated mandrel. Due to the heat from the mandrel, the resin will melt and become sticky and therefore, it is important to locate the support rollers close to the point of application of the tape in an area where the resin has not as yet melted and will still be firm and untacky.

In the event the continuous process of pipe fabrication is stopped, the resin on the tape applied to the mandrel in the area of the support rollers 150, will be heated sufficiently to become tacky. In this case, it is important that an auxiliary support be provided so that the support rollers 150 will not contact the tacky resin. In this regard, the arm 147 is provided with a pair of angular supports 151 which carry plates 152. Each of the plates 152 carries three bearing assemblies 153 which are positioned in generally triangular arrangement. A shaft 154 is journaled within each of the bearing assemblies 153, and the lowermost shafts associated with each plate 152 carry a supply spool 155 and a re-wind spool 156, respectively, while the uppermost shaft associated with each plate carries a drive roller 157. A strip of cellophane or other expendable parting material 155a is supported on the spool 155 and passes over the drive roller 157 and is rewound on the spool 156.

The drive roller 157 is adapted to be moved into contact with the tape 2 on mandrel 3 when the rollers 150 are moved out of contact with the mandrel. In this event, the longitudinal movement of the mandrel will rotate the drive roller 157 and through a drive arrangement, the cellophane strip will be drawn from the spool 155, and passed over the drive roller 157 and collected on spool 156.

The drive system for the movement of the cellophane strip includes a drive sprocket 158 attached to the lower end of the shaft 154 associated with the drive roller 157. The sprocket 158 is connected to a suitable sprocket 159 on the shaft 154 associated with spool 156 by a chain 160.

The freedom of rotation of the shafts 154 carrying drive rollers 157 and spool 155 is controlled by suitable spring assemblies associated with the lower end of the respective shafts. The spring assemblies include a coil spring 161 disposed around the respective shafts 154, and a suitable nut is threadedly engaged with the lower end of the shaft. By turning the nut, the tension on the shaft is varied.

To selectively move the rollers 150 into engagement with the mandrel 3, a cylinder 162 is pivotally attached at 163 to the plates 146. The piston rod 164 of the cylinder 162 is attached through link 165 to the end of the arm 147. Air is introduced into the lower end of cylinder 162 through line 166 to pivot arm 147 upwardly and move the rollers 150 into contact with the mandrel 3.

By introducing air into the upper end of the cylinder through line 167, the arm 147 is pivoted downwardly to move the rollers 150 out of contact with the mandrel and bring the drive rollers 157 into contact with the mandrel.

With this construction, the support rollers 150 can be moved out of contact with the mandrel at any time the tape is not being applied to the mandrel or at any time the advancement of the mandrel 3 is stopped. It is contemplated that the action of the cylinder 162 can be tied in with the speed of rotation of the winding head 8 or disc 14 so that if the speed of the disc falls below a predetermined value, the cylinder 162 will operate to move the support rollers 150 out of contact with the pipe and bring the auxiliary rollers 157 into contact with the mandrel to support the same. As the rollers 157 are covered with a film of cellophane tape, there is no danger of the resin sticking to the rollers 157. If the mandrel advancement continues, even though the speed of the winding head has dropped below the given value, the rollers 157 will be driven to unreel the cellophane strip from the spool 155 and wind the used tape on the spool 156. Thus, the dirtied cellophane strip is automatically wound on the spool 156.

The vertical adjustment of the beam 141 through the use of the shaft 143 and nut 144 enables the support unit 130 to be employed with different diameter mandrels. By merely turning the shaft 143 within the nut 144, the position of the support rollers 150 and 157 can be varied in height to accommodate mandrels of various diameters. In addition to the vertical adjustment, the wheels 134 on the base 131 provide a ready longitudinal adjustment for the support unit. This is important in that, as previously pointed out, the position of the rollers 150 should be immediately forward of the point of application of the tape 2 onto the mandrel. Therefore, if the helix angle of winding is changed by changing the angularity of the distributing roller 67, it will also be necessary to vary the location of the support rollers 150. This can be readily done by loosening the clamps 135 and moving the support unit 130 along the beams 7 to the proper position.

The feeding mechanism 4, which is employed to move the mandrel 3 through the winding heads 1, and curing oven 5, is best shown in FIGS. 13–15 and includes a generally rectangular base 168 which supports a frame 169. To support the frame 169, a pair of transverse support plates 170 are secured to the upper edge of the base 168 and the frame rests on the support plates.

The frame 169 includes four vertical corner posts 171 which are connected at their upper edges by a pair of longitudinal top beams 172 and a pair of transverse top beams 173. In addition to the top beams, the posts 171 are connected together by a pair of longitudinal central supports 174 and a pair of transverse central supports 175.

A pair of vertical columns 176 extend between the longitudinal top beams 172 and the longitudinal central supports 174 at each side of the frame.

A longitudinal support beam 177 is adjustably supported at each side of the frame on the transverse central support 175. To provide the vertical adjustment for the beams 177, a threaded shaft 178 is threadedly engaged with nut 179 attached to the lower surface of the beams 177. The lower end of the shaft 178 engages an adjustable stop 180 secured to the transverse central supports 175.

The threaded shaft 178 carries a sprocket 181 and a chain 182 connects the sprockets together and insures that both beams 177 will be raised in unison. Slack in chain 182 is taken up by means of a sprocket 183 supported by adjustable bracket 184.

The chain 182 is driven to raise or lower the beams 177 by a drive sprocket 185 which is connected to a shaft 186 threadedly secured within bracket 187. By manually turning shaft 186 within the bracket 187, the drive sprocket 185 is rotated to drive the chain and raise or lower the support beams 177, as desired.

Each longitudinal support beam 177 supports a pair of bearing housings 188 which house bearings 189. Sprocket shafts 190 are journaled within bearings 189 and one of the shafts carries a pair of drive sprockets 191, while the other shaft carries a pair of idler sprockets 192. The sprockets 191 and 192 are connected together by a link chain 193.

As best shown in FIGS. 13 and 15, each link of chain 193 is provided with a pair of outwardly extending flanged angles 194 and shoes 195 are secured to the flanges of the angles 194. The shoes 195 are adapted to travel with the chain 193 and engage and drive the mandrel 3 in the direction of chain travel.

In addition to the longitudinal support beams 177, a pair of upper longitudinal support beams 196 are hung from the longitudinal top beams 172 and support a similar chain drive mechanism for the mandrel. A shaft 197 is threadedly engaged with nut 198 attached to the upper surface of beams 196. The upper end of the shaft 197 extends through an opening in a collar 199 which is supported by a bracket 200 from beams 173. The upper end of the shaft 197 is engaged with the nut 201 which prevents the shaft from pulling out of the opening in collar 199.

Sprockets 202, similar to sprockets 181, are attached to each shaft 197 and are connected together by a chain 203.

Chain 202 is driven by a drive sprocket 204 which is secured to shaft 205 journaled within bracket 206. By manually threading the shaft within the bracket 206, the drive sprocket 204 is rotated to drive the chain 203. Slack in the chain 202 is taken up by a sprocket 207 which is adjustably secured to a bracket 208 attached to beams 172.

The beams 196 each carry a pair of bearing housings 209, similar to bearing housings 188, and the housings encase bearings 210. Sprocket shafts 211 are journaled within the bearings 210 and one of the shafts carries a pair of drive sprockets 212 while the other shaft carries a pair of idler sprockets 213. The corresponding sprockets 212 and 213 are connected together by a chain 214 which is similar to chain 193. Each link of chain 214 is provided with a pair of angle brackets 215 and shoes 216, which complement shoes 195, are attached to the flanges 215 of the angle brackets.

Each of the shoes 195 and 216 is provided with a series of generally arcuate, concave recesses 217 which are adapted to receive the mandrel 3. The recesses 217 in each shoe are aligned transversely of the axis of the mandrel and are each provided with a different radius adapted to accommodate mandrels of different diameter. The recesses 217 of lower shoes 195 complement the corresponding recess in the upper shoes 216.

As shown in FIG. 15, the left hand recess has the largest radius and is adapted to receive a mandrel of largest diameter. The remaining recesses 217 have smaller diameters and are adapted to receive standard size mandrels of smaller diameter.

To increase the frictional contact of the shoes with the mandrel, the upper surface of each shoe is provided with a rubber or resilient pad 218.

Each of the chains 193 and 214 travel in an endless path having generally straight portions of travel which are opposed to each other. The shoes 195 and 216 are in proximate relation to each other when passing along the straight section of the endless path to provide a substantially continuous surface adapted to engage and drive the mandrel. The straight section of travel of the shoes provides an increased area of contact between the shoes and the mandrel to increase the efficiency of the forward movement or advancement of the mandrel.

The vertical adjustment of the support beams 177 and 196 by means of the threaded shafts 178 and 197 enables the shoes associated with each chain to be moved toward the shoes of the other chain to compensate for any wear that may occur in the resilient pads 218 and to maintain the proper pressure on the mandrel for driving the same.

To drive the chains 193 and 214, the end of each shaft 190 and 211 carries a sprocket 219 which is engaged and driven by a chain 220. The chain 220 is driven by a drive sprocket 221 which is secured to the output shaft 222 of a speed reducer 223. Slack in the chain 220 is taken up by means of a sprocket 224 which is secured to an adjustable bracket 225 attached to beam 172. As best shown in FIG. 13, the chain drive 220 drives the sprockets 219 in the direction of the arrows to move the chains 193 and 214 in the same direction.

The speed reducer 223 is supported on a beam 226 which rests on angle supports 227. Speed reducer 223 is driven by a chain drive which permits lateral movement of the frame 169 with respect to the base 168. The chain drive includes a chain 228 which is connected to a sprocket 229 attached to the input shaft of the speed reducer 223. The chain 228 also passes over a pair of sprockets 230 secured to bracket 231 carried by beam 226 and over a tensioning sprocket 232 which is secured through an adjustable plate 233 to base 168. The chain is driven by a drive sprocket 234 which is attached to drive shaft 235 journaled within bearings 236 attached to the base 168. Shaft 235 is driven by a motor 237. With this construction, the frame 169 can be moved relative to the base 168 and yet maintain the drive connection between drive shaft 235 and the input shaft of the speed reducer 223.

To guide the shoes in movement along the straight section of the endless path, a pair of transverse beams 238 are supported on beams 177. The beams 238 rest on blocks 239 secured to the upper surface of beams 177. Longitudinal beams 240 are supported on transverse beams 238 and the upper surface of each beam 240 is provided with a wear plate 241 which is adapted to engage a complementary wear plate 242 secured to the inner surface of each of the shoes. The beams 240 serve to guide the shoes in travel and prevent the shoes and chain from sagging between the sprockets 191 and 192.

The upper shoes 216 are supported in movement in a similar manner. In this case, transverse beams 243 are carried by beams 196 and spacer blocks 244 are disposed between the beams 196 and 243. Longitudinal beams 245 are carried by the beams 243 and are provided with wear plates 246. The wear plates 246 are adapted to be contacted by wear plates 247 attached to the inner surface of the upper shoes 216.

An additional guide is provided to prevent the shoes from moving inwardly toward the mandrel. In this regard, brackets 248 are secured to the beams 238 and 243, respectively, and extend inwardly toward the horizontal plane of the mandrel. Each of the brackets 248 carries a longitudinally extending beam 249 which is adapted to ride on the edge 250 of the shoes 195 and 216. Wear plates 251 and 252 are secured to the surfaces of the beams 249 and the edges 250 of the shoes, respectively.

To guide the shoe supporting structure in vertical movement, the inner edge of T-beams 176 engage the ends of beams 238 and 243, as best shown in FIG. 14. This contact between the beams 176, and beams 238 and 243 maintains the proper alignment of the shoe structure during vertical adjustment.

To prevent displacement of the guiding relation between the T-beams 176 and the beams 238 and 243, an edge plate 253 is secured to one of each pair of T-beams 176 by bolts 254. The edge plate 253 prevents the disengagement of the T-beam from the beams 238 and 243.

The frame 169 is adapted to move laterally with respect to the base 168 to align the various recesses 217 with the axis of the winding heads 8. This adjustment permits the feed mechanism to be employed with mandrels of various diameter and by merely moving the frame 169 laterally with respect to the base, the proper diameter recesses 217 can be brought into alignment with the axis of the winding heads 8 and spools 15.

The base angles 227 of the frame 169 are adapted to slide on the support plates 170. To move the frame across the plates 170, shafts 255 are journaled within bearings 256 at the sides of the base 168 and extend transversely or laterally of the feed mechanism. Each shaft 255 is provided with a threaded portion 257 which is threadedly engaged within nuts 258 secured to the lower end of the frame 169.

To connect the shafts 255 together, a sprocket 259 is secured to each shaft and a chain 260 serves to connect the sprockets. The slack is taken up in the chain 260 by a sprocket 261 which is secured to an adjustable bracket 262.

By rotating one of the shafts 255 by means of a hand crank, the threaded portion 257 will move within the nuts 258 to move the frame 169 relative to the base 168 and thereby align the desired recesses 217 with the axis of the winding heads 8.

To move each of the shafts 255 individually in order to make separate adjustments of the forward and rear ends of frame 169, a clutch 263 is associated with each of the shafts. By disengaging the clutch associated with one shaft, this shaft will not operate in unison with the other shaft and therefore, the fore and aft position of the frame 169 can be regulated to insure axial alignment of the recesses 217 with the axis of the winding heads 8.

The mandrel 3 may be heated in any desired manner. As shown in FIG. 2, heat is supplied to the mandrel by an induction heating coil 264 which is supported by a bracket 265 extending outwardly from the hub 12. An induction heating coil 264 is associated with each of the winding heads 1 so that the mandrel will be maintained at a susbtantially uniform temperature throughout its length.

The heat from the induction heating coil serves to melt the resin on the tape 2 into a homogeneous liquid mass to integrally bind the fibers of the tape together. It is contemplated that the resin on the inner layers of the tape 2 adjacent the mandrel may fully cure during the winding operation. However, the resin associated with the outer layers in the pipe will not be fully cured when the pipe passes through the last of the winding units 1 and therefore, the oven 5 is provided to heat the pipe to the desired temperature to provide a complete cure or polymerization for the resin in all layers.

The mandrel 3 is fed continuously through the apparatus and for handling ease the mandrel is composed of a series of mandrel sections 266 which are joined together in an end-to-end relation. The ends of the mandrel sections 266 are spaced apart by a generally tubular sleeve 267 which has an external diameter substantially the same as the sections 266.

The sleeve 267 is made of plastic or the like and provided with an outwardly projecting ridge 268 over which the tape 2 is wound. The ridge 268 serves as a marker or indicator as to the location of the joint between the mandrel sections 266 so that the wound pipe 269 can be cut at this location without cutting into the mandrel sections 266.

The mandrel sections 266 are joined together by a male plug 270 which is inserted within the end of one of the sections and is engageable with a female plug 271 disposed within the opposed end of the other mandrel section.

In operation of the apparatus of the invention, the frame 169 for the feeder mechanism is initially adjusted in a lateral direction to align the proper diameter shoes 195 and 216 with the openings in the spools 15.

Figure 20:
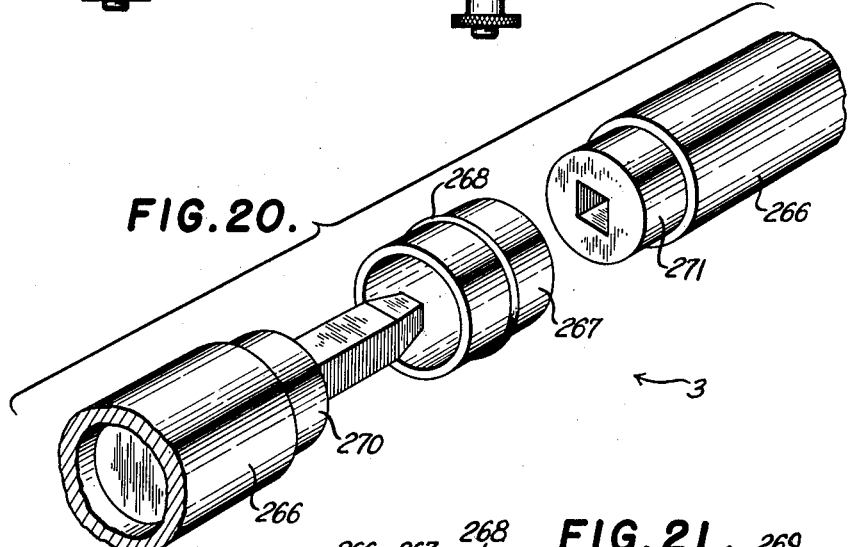
FIG. 20 is an exploded perspective view of the connection for the mandrel sections.
Figure 21:
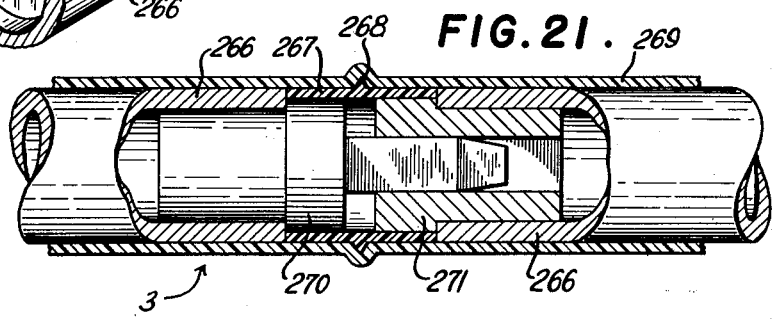
FIG. 21 is a side elevation with parts broken away in section and showing the mandrel connection.

As shown in FIGS. 20 and 21 the mandrel sections 266 are then assembled together with the spacer sleeves 267 disposed between the adjacent ends of the mandrel sections. The mandrel 3 is then fed by the feeder mechanism through the openings in the spools 15 of winding units 1. When the mandrel has progressed through the entire series of winding units, the advancement of the mandrel is stopped and the tapes 2 of each winding unit are secured to the mandrel.

The feeding mechanism and the winding units are then started in unison to advance the mandrel and simultaneously wind the tapes onto the mandrel in a helical pattern. As previously noted, each alternate winding unit rotates in the opposite direction to provide the tape in each layer of the pipe with the opposite helix angle.

The heated mandrel 3 serves to melt the resin into a homogeneous mass and to firmly bind the fibers together. As mentioned previously, the heat derived from the mandrel 3 may serve to completely polymerize the resin of the inner layers. After passing through the winding units, the mandrel with the tape wound thereon is fed through the curing oven 5 where the pipe is heated to a temperature sufficient to bring about a complete cure of the resin in all layers.

After leaving the oven, a slicer or knife automatically engages the pipe 269 at the location of the ridge 268 on the spacer sleeve 267 and cuts through the pipe to sever the pipe into a series of smaller lengths.

The pipe lengths disposed on each mandrel section are then individually stripped from the respective mandrel sections and the ends of the pipe lengths can then be trimmed for its ultimate use.

The apparatus of the invention provides a continuous operation for winding a tubular article. As the tape 2 or other material to be wound is contained on a spool 15 which is disposed coaxially with the mandrel 3, the apparatus is inherently in balance regardless of whether the spool is empty or full. As the apparatus is in balance at all times, the winding units can be run at a substantially greater speed which correspondingly increases the capacity of the machine over that of conventional units.

Figure 26:
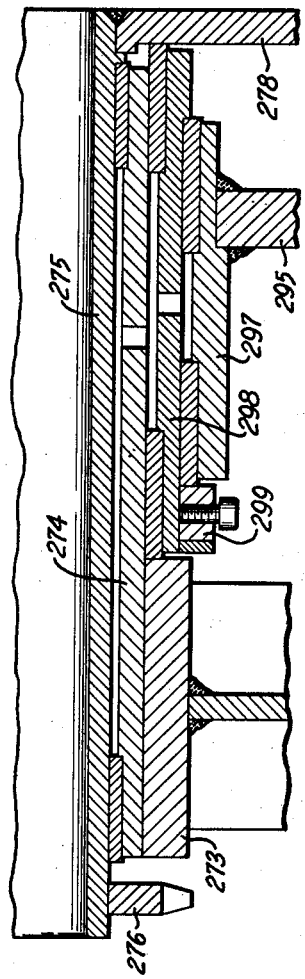
FIG. 26 is a fragmentary enlarged vertical section showing the rotating elements of the winding unit of FIG. 24.
Figure 24:
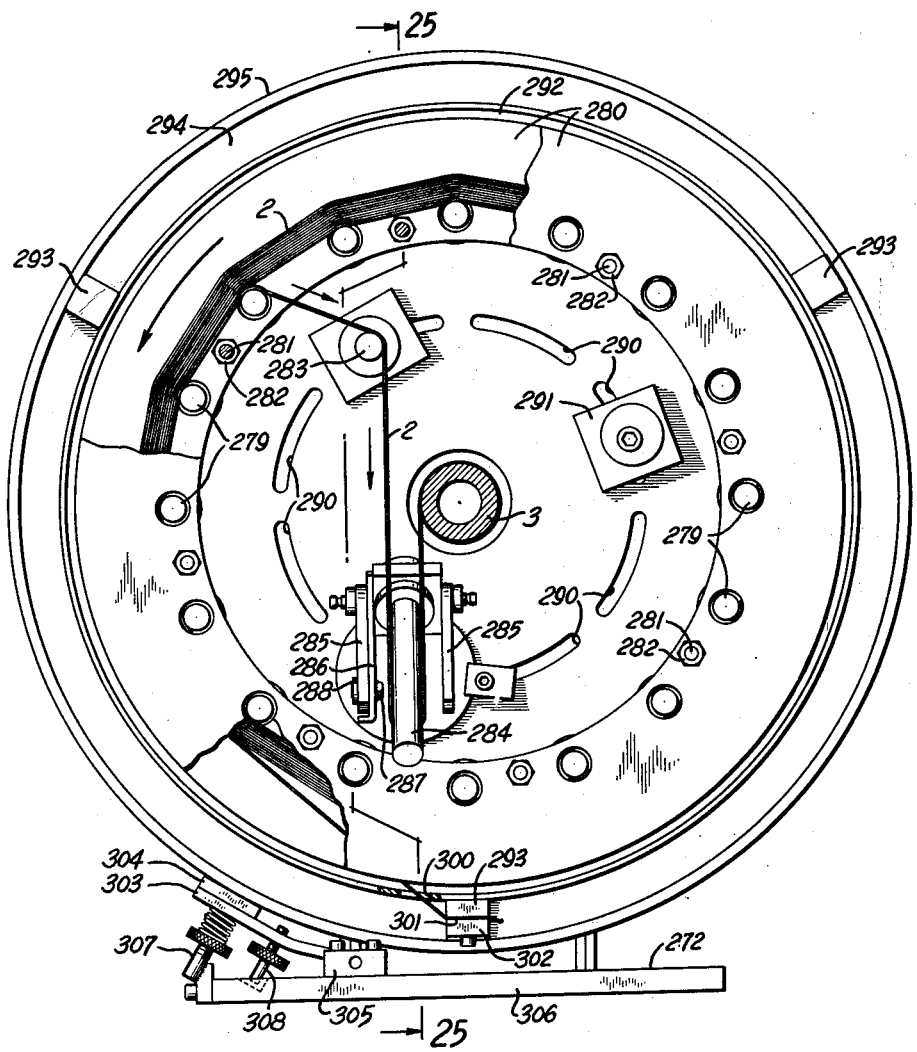
FIG. 24 is an end view of a modified form of the winding unit with parts broken away.
Figure 25:
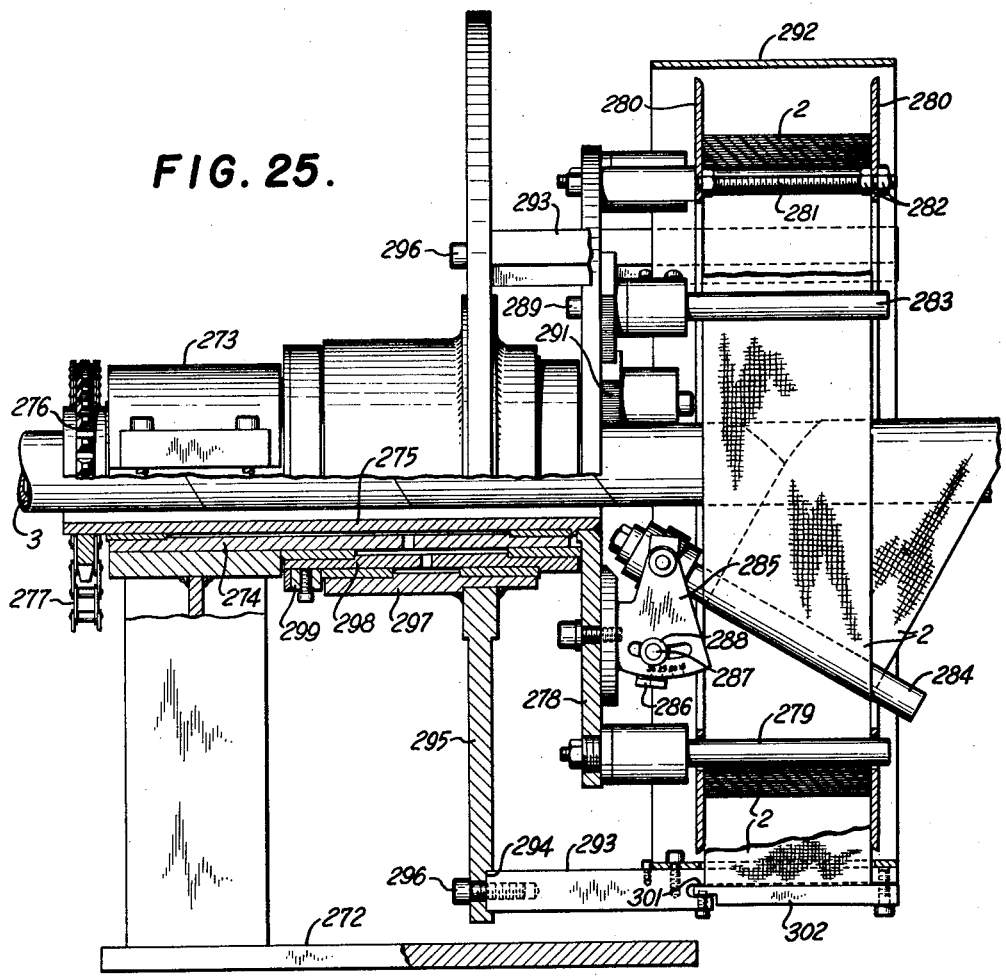
FIG. 25 is a view taken along line 25—25 of FIG. 24 with parts removed for clarity.

FIGURES 24 through 26 illustrate a second embodiment of the invention in which a modified form of the winding unit is employed. In this embodiment, the winding unit comprises a base 272 which carries a split hub 273 and corresponds generally to the hub 12 of the first embodiment.

As shown in FIGS. 25 and 26 a non-rotatable tube 274 is secured within the hub 273 and projects outwardly therefrom. A shaft 275 is journaled within the tube and the mandrel 3 is adapted to be advanced longitudinally through the tube 274.

The shaft 275 is driven by means of a sprocket 276 which is attached to an end of the shaft. A chain 277 connects the sprocket 276 to the drive shaft 54.

The opposite end of the drive shaft 275 supports a disc 278 which is adapted to rotate with the shaft. The resin impregnated tape 2 is supported by a plurality of rollers 279 which are secured in circularly spaced relation to the forward face of the disc 278 and, in effect, serve as a spool or generally cylindrical support to support the tape in coiled form.

The tape is contained on the rollers 279 by a pair of side plates 280 which are supported by a series of threaded pins 281. Pins 281 are connected to the forward face of disc 278 and are disposed on a circle of slightly smaller radius than the rollers 279 so that the tape 2 does not normally contact the pins 281.

The outer of the side plates 280 can be moved laterally by loosening the lock nuts 282 to adjust the plate for tapes of various widths.

The inner end of the coiled tape 2 is adapted to be drawn from the spool and wound on the mandrel 3 which is advancing through the winding unit. The tape is guided to the mandrel by a guide roller 283 which is secured to disc 278 and by a distribution roller 284, also secured to disc 278. As best shown in FIG. 24, the inner end of the coiled tape 2 passes inwardly between a pair of adjacent rollers 279, around guide roller 283, then around distribution roller 284 and onto the mandrel 3. The space between adjacent rollers 279, through which the tape 2 passes, constitutes a discontinuity in the generally cylindrical support for the coiled tape.

The distribution roller 284 can be adjusted to vary the helix angle of the tape being wound on the mandrel. In this regard, the inner end of the roller 284 is pivotally connected between a pair of brackets 285 which are connected to the forward face of the disc 278. An adjustable arm 286 is secured to the roller 284 and is also pivoted at the connection between the roller and the brackets 285. By pivoting the arm 286, the roller 284 can be correspondingly pivoted to vary the helix angle of the tape being wound on the mandrel.

The roller 284 can be locked in any desired position by means of a stud 287 which extends outwardly from arm 286 through a suitable slot in the bracket 285, and the outer end of stud 287 is engaged with a nut 288. By loosening nut 288, roller 284 can be pivoted to change the helix angle of winding as desired.

As in the case of the first embodiment, it is desired that the portion of the tape or fibrous strand 2 approaching the distribution roller 284 be located in a parallel plane with that portion of the tape 2 leaving the distribution roller and being wound on the mandrel 3. This can be accomplished by moving the guide roller 283 with respect to the disc 278. As best shown in FIG. 25, the roller 283 is attached to the disc 278 by means of a stud 289 which extends through one of a series of arcuate slots 290. By loosening the stud and moving the roller within the slot, or to another slot, the tape approaching the distribution roller can be maintained generally parallel with the tape leaving the roller.

The rollers 283 and 284 are counterbalanced by means of a weight 291 which is adjustably connected to the face of the disc 278. A suitable stud extends through the weight 291 and through one of the arcuate slots 290 formed in the disc. By loosening the stud and moving the same within the slot, the position of the counterweight 291 can be varied, as desired.

The coiled tape 2 is covered by an outer cylindrical casing 292 which is supported by a series of generally square rods 293. The inner ends of the rods 293 are disposed within a circular groove 294 or recess in the face of a plate 295 and are secured therein by bolts 296.

The plate 295 is secured to a sleeve 297 which is journaled on an inner sleeve 298 and the inner sleeve, in turn, is journaled about the stationary tube 274. With this construction, the plate 295 can rotate freely about tube 274 during the winding operation.

The sleeve 297 is retained in position on the sleeve 298 by means of a retaining ring 299.

The disc 278, which supports the coil of tape 2, is adapted to be rotated as the mandrel 3 is advanced therethrough. As the inner end of the tape is drawn from the coil and wound on the mandrel, it is desirable to hold the outer or free end of the tape. The outer end of tape 2 extends outwardly through a slit 300 in the casing and is clamped within a recess 301 formed in one of the rods 293. The tape is held within the recess by means of a clamp insert 302 which is secured therein by suitable bolts.

It is necessary that some tensioning be applied to the tape 2 being wound on the mandrel 3. The tensioning may take the form of a series of tensioning rollers as in the case of the first embodiment, or, as shown in FIG. 24, the tensioning force can be associated with the casing 292. In this connection, a braking plate 303 having a friction pad 304 is secured to a block 305 connected to base plate 306. The friction pad 304 is adapted to be forced into contact with the outer surface of the cylindrical casing 292 by a pair of adjusting screws 307 and 308. The screw 307 is spring biased and is adapted to provide a light adjustment for the braking action, while the adjusting screw 308 serves to provide a heavy adjustment for the braking action.

The operation of the winding unit, shown in this embodiment, is identical with that of the first embodiment. However, in this case, the inner end of the tape is taken from the coil, attached to the mandrel and wound onto the mandrel rather than the outer end as in the first embodiment.

By taking the tape from the inner end of the coil or spool, an advantage is provided in that tape can be wound or supplied to the spool without stopping operation of the apparatus for any appreciable period of time. For example, after a substantial portion of the tape 2 of the spool has been wound on the mandrel, the apparatus is momentarily stopped and the free outer end of the coiled tape is released from the clamp 302. The end of a coiled supply reel of tape is then attached to the free outer end of the tape 2 on the spool. The apparatus is again started up at a slower rate of speed and as the tape is being wound on the mandrel, the tape from the supply reel is wound onto the spool. As the diameter of the spool is substantially greater than the diameter of the mandrel, the tape will be wound on the spool at a more rapid rate than it is drawn off for winding on the mandrel.

It is contemplated that when the tape is wound to a sufficient depth on the spool, the winding is momentarily halted to cut the outer end of the tape. The cut end of the tape is then reinserted within the clamp 302.

It is contemplated that in some instances the free end of the tape 2 need not be retained or clamped within any fixture. In a case such as this, the attachment of a supply of tape to the free end of the tape 2 on the spool is simplified in that the tape need not be removed from the clamp 302 nor reinserted within the clamp after the desired amount of tape has been wound on the spool. In this situation after the spool has been refilled, the end of the tape can be automatically cut and the winding operation continued without a pause.

As the tape is drawn from the inside of the spool, no cooling of the winding unit is required in this structure. Heat radiated from the mandrel will be absorbed by the inner turns or layers of the tape on the spool and as these turns of the tape are the ones that are being drawn off, there is no danger of the resin associated with the tape 2 on the spool being fully polymerized by heat from the mandrel.

As the distribution roller 284 is located inwardly of the spool, the external diameter of the apparatus is decreased. This results in a shorter spacing or distance between adjacent winding units due to the fact that the tape does not have to travel outwardly of the spool and then angularly onto the mandrel. The reduction in overall diameter of the apparatus means that the winding units can be run at a substantially greater speed which again increases the productive capacity of the apparatus.

As the spool containing the tape 2 is disposed coaxially with the mandrel, the apparatus is inherently balanced, regardless of whether the spool is empty or full, and this enables the winding units to be run at very high speeds.

Various modes of carrying out the invention are contemplated as being within the scope of the following claims particularly pointing out and distinctly claiming the subject matter which is regarded as the invention.

I claim:

1. An apparatus for fabricating tubular reinforced plastic articles, comprising a spool having an annular strip supporting surface to support a coiled strip of generally unidirectional fibers coated with a solid uncured resin, said spool having an axial opening therein, a mandrel disposed within said opening and disposed coaxially of said strip supporting surface, means for axially advancing said mandrel, means for rotating the spool about the axis thereof to thereby wind the strip in a generally helical pattern on said advancing mandrel to form a tubular article, means for heating the portion of the strip being wound on the mandrel to melt the resin and completely impregnate said fibers with said melted resin, and means separate from said last named means for curing the resin to provide a strong rigid article.

2. An apparatus for fabricating tubular reinforced plastic articles, comprising a mandrel, a spool having an opening to receive the mandrel and having an annular strand supporting surface disposed coaxially of said opening, said surface supporting a coiled fibrous reinforcing strand impregnated with a solid uncured plastic material, means for mounting said spool for rotation about the axis thereof, means for advancing said mandrel longitudinally, means for winding said strand on said mandrel in a generally helical pattern to form a tubular article, heating means for supplying heat to the portion of the strand wound on said mandrel to melt the plastic material and provide a homogeneous mass, support means for supporting the mandrel for longitudinal movement, said support means being located in proximate relation to the position of application of the strand to the mandrel in an area where the resin has not melted and the tape is firm and untacky, and means separate from said heating means for curing the plastic material and providing a solid tubular article.

3. An apparatus for continuously fabricating tubular reinforced plastic articles, comprising a generally cylindrical mandrel, a series of axially aligned spaced winding heads with each winding head having a coiled strip of fibrous reinforcing material disposed coaxially with the mandrel and impregnated with a solid uncured resin, means for rotating each alternate winding head in the opposite direction about the axis of the mandrel, feeding means for advancing the mandrel longitudinally through the coiled strips, guide means associated with each winding head for guiding the respective strip to the mandrel to thereby wind the strips in a series of superimposed layers on said mandrel with each alternate layer having the opposite helix angle to provide a double helical pattern, heating means for heating the mandrel to melt the resin and provide a homogeneous resin mass to bond the layers together, and means separate from said heating means for curing the resin to provide a hard strong article.

4. In a guide structure for guiding a strip from a spool onto a longitudinally advancing mandrel mounted coaxially with said spool, a rotatable support member mounted coaxially with the mandrel and adapted to be rotated about the axis thereof, a distribution guide member associated with said support member and extending outwardly therefrom at an angle to the axis of said support member and adapted to receive the strip and guide the same onto the mandrel in a helical pattern, a second guide member associated with the support member and disposed inwardly from the distribution guide member toward the axis of said support member and adapted to guide the strip being drawn from the spool to the distribution guide member, and means for maintaining the portion of said strip traveling from the second guide member to said distribution guide member in a substantially parallel plane with the portion of the strip traveling from said distribution guide member to the mandrel.

5. A winding head for winding a strip onto a longitudinally advancing mandrel mounted coaxially with the winding head, comprising a spool supporting the strip in coiled form and having an axial opening to receive the mandrel, a rotatable support member having an axial opening in alignment with the opening in said spool to receive the mandrel and mounted for rotation about the axis thereof, drive means for rotating said support member, a distribution guide member associated with said support member and extending outwardly therefrom at an angle to the axis of said support member and adapted to receive the strip and guide the same onto the mandrel in a helical pattern, a second guide member associated with the support member and disposed inwardly from the distribution guide member toward the axis of said support member and adapted to guide the strip being drawn from the spool to the distribution guide member, and means for selectively adjusting the location of said second guide member on the support member to thereby maintain the portion of said strip traveling from the second guide member to said distribution guide member in a substantially parallel plane with the portion of the strip traveling from said distribution guide member to the mandrel.

6. In a guide structure for guiding a strip from a spool onto a longitudinally advancing mandrel mounted coaxially with said spool, a rotatable support member mounted coaxially with the mandrel and adapted to be rotated about the axis thereof, a distribution guide member associated with said support member and extending outwardly therefrom at an acute angle to the axis of said support member and adapted to receive the strip and guide the same onto the mandrel in a helical pattern, and means for maintaining the portion of the strip approaching said guide member in a substantially parallel plane with the portion of the strip leaving said guide member and traveling to said mandrel.

7. A winding head for winding a strip onto a longitudinally advancing mandrel mounted coaxially with the winding head, comprising package means having an annular strip supporting surface for supporting the strip and having an opening disposed coaxially with said surface to receive the mandrel, guide means including a guide member disposed radially of said package means for guiding said strip from said package means and winding the strip on the mandrel to form a tubular article, means for rotating said package means about the axis of said opening, and means for positioning the portion of the strip immediately approaching said guide member in a substantially parallel plane with the portion of the strip immediately leaving said guide member and traveling to said mandrel.

8. A winding head for winding a strip onto a longitudinally advancing mandrel mounted coaxially with the winding head, comprising a hollow member having open ends and adapted to receive the advancing mandrel, a rotatable member journaled about said hollow member for rotation about the axis thereof, drive means for rotating said rotatable member, a spool disposed in axial alignment with said hollow member and journaled for free rotation with respect to said rotatable member and supporting a strip of reinforcing material in coiled form, and guide means connected to said rotatable member and disposed in a radial direction from said spool and extending at an acute angle to the axis of said spool for guiding the strip from the spool and winding the strip on the mandrel to form a tubular article.

9. The structure of claim 8, and including frictional resistance means to contact said spool and impart a frictional resistance to the free rotation of the spool on said sleeve.

10. The structure of claim 8, and including a frictional pad disposed between adjacent surfaces of said rotatable member and said spool to impart a friction resistance to the free rotation of the spool on said sleeve, and adjustable means for varying the magnitude of the friction resistance.

11. In an apparatus for fabricating a reinforced plastic pipe, a generally cylindrical mandrel, a spool mounted coaxially with the mandrel and containing a strip of reinforcing material, a pair of feed members disposed to cooperatively engage the mandrel, each of said feed members having a series of generally concave recesses of different diameters aligned transversely of the axis of the mandrel and disposed to receive the mandrel in cooperation with a complementary recess of the other feed member, drive means for moving the feed members in unison in a direction parallel to the axis of the mandrel to thereby advance the mandrel axially through the spool, means for drawing the strip from the spool and winding the same on the advancing mandrel to form the pipe, and means for moving the feed members laterally of the axis of the mandrel to selectively align the recesses of desired diameter with the axis of the mandrel.

12. In an apparatus for fabricating a reinforced tubular article, a mandrel, means for advancing the mandrel longitudinally, winding means for winding a strip of reinforcing material impregnated with a solid uncured resin on the advancing mandrel to form the article, heating means for heating the mandrel and melting the solid resin associated with the strip wound on the mandrel, a support member disposed to support the mandrel in advancing movement and located immediately adjacent said winding means in the direction of mandrel advancement, and means responsive to the speed of the winding operation for withdrawing the support member from engagement with the mandrel when the speed of the winding operation is slowed down below a predetermined value.

13. In an apparatus for fabricating a reinforced tubular article, a mandrel, means for advancing the mandrel longitudinally, means for winding a strip impregnated with a solid uncured resin on the mandrel to form the article, heating means for heating the mandrel and melting the solid resin associated with the strip wound on the mandrel, a support member disposed to support the mandrel in advancing movement and located immediately adjacent the position of application of said strip of the mandrel in the direction of mandrel advancement, auxiliary support means separate from said first named support member and disposed to support the mandrel when the first support member is out of engagement with the mandrel, means for withdrawing the support member from engagement with the mandrel when the speed of winding falls below a predetermined value, and means acting simultaneously with said last named means for moving said auxiliary support means into engagement with the mandrel to support the same when said support member is withdrawn from the mandrel.

14. In an apparatus for fabricating a reinforced tubular article, a mandrel, means for advancing the mandrel longitudinally, means for winding a strip impregnated with a solid uncured resin on the mandrel to form the article, heating means for heating the mandrel and melting the solid resin associated with the strip wound on the mandrel, a support member disposed to support the mandrel in advancing movement and located immediately adjacent the position of application of said strip to the mandrel in the direction of mandrel advancement, auxiliary support means separate from said first named support member and disposed to support the mandrel when the first support member is out of engagement with the mandrel, means for withdrawing the support member from engagement with the mandrel when the speed of winding falls below a predetermined value and the resin at the position of application of the strip to the mandrel is melted, and means acting simultaneously with said last named means for moving said auxiliary support means into engagement with the mandrel to support the same when said support member is withdrawn from the mandrel, and an expendable parting material disposed on said auxiliary support means and adapted to be contacted by the melted resin when said auxiliary support means is supporting the mandrel.

15. The structure of claim 13, wherein the auxiliary support means comprises, a roller disposed to support the mandrel when said support member is withdrawn from the mandrel, a strip of parting material disposed on the surface of said roller and serving to prevent contact between the roller and the melted resin, and means for advancing said strip of parting material over the surface of said roller to progressively dispose a clean portion of said strip on said surface.

16. The structure of claim 13 wherein the auxiliary support means comprises, a driven roller disposed to support the mandrel when said support member is withdrawn from the mandrel and driven by advancement of said mandrel, a supply reel containing a coiled strip of parting material, a re-wind reel to contain the used strip of parting material, said strip of parting material extending from said supply reel over the supporting surface of said driven roller to said re-wind reel, and drive means interconnecting said driven roller and said re-wind reel for driving the same in unison to thereby continually unwind the strip of parting material from said supply reel and move the strip across the supporting surface of said driven roller and wind the used strip on said re-wind reel in accordance with advancement of the mandrel.

17. An apparatus for fabricating a reinforced plastic pipe, comprising a mandrel, a spool mounted coaxially with the mandrel and containing a coiled strip of reinforcing material impregnated with a solid uncured resin, means for advancing the mandrel longitudinally through the spool, guide means for guiding the strip onto the mandrel in a generally helical winding pattern to form the pipe and including a generally cylindrical distribution roller disposed in radial alignment with said spool, means for selectively varying the angle between the axis of said distribution roller and the axis of the mandrel to change the helix angle of the winding pattern, heating means for heating the portion of the strip wound on the mandrel to melt the resin contained in said portion, support means for supporting the mandrel and located adjacent the spool in the direction of mandrel advancement whereby said support means engages the strip immediately after application of said strip to the mandrel and before the resin is melted, and means for moving said support means and said distribution roller relative to each other to thereby maintain the location of the support means adjacent the position of application of said strip to the mandrel at all helix angles of winding.

18. A winding head for winding a strip onto a longitudinally advancing mandrel mounted coaxially with the winding head, comprising a hollow member having open ends and adapted to receive the advancing mandrel, a rotatable member journaled about said hollow member for rotation about the axis thereof, drive means for rotating said rotatable member, a spool disposed in axial alignment with said hollow member and journaled for free rotation with respect to said rotatable member, said spool supporting a strip of reinforcing material in coiled form, a plurality of guide members connected to the rotatable member and disposed in a radial direction from said spool, said guide members serving to support the strip and guide the same from the spool and onto the mandrel to form the tubular article, and tensioning means associated with at least one of said guide members for maintaining the strip passing from the spool to the mandrel under a desired degree of tension.

19. The structure of claim 8 and including counterweight means connected to the rotatable member for counterbalancing the weight of said guide means and effecting balanced rotation of said rotatable member.

20. A winding head for winding a strip onto a longitudinally advancing mandrel mounted coaxially with the winding head, comprising a hollow member having open ends and adapted to receive the advancing mandrel, a rotatable member journaled about said hollow member for rotation about the axis thereof, drive means for rotating said rotatable member, a spool disposed in axial alignment with said hollow member and journaled for free rotation with respect to said rotatable member and disposed adjacent said rotatable member in the direction of mandrel advancement, said spool supporting a strip of reinforcing material in coiled form, a distribution roller extending outwardly from the rotatable member at an acute angle to the axis of said mandrel and disposed radially outward of the spool in position to support the strip and guide the same onto the mandrel in a helical pattern with the helix angle of said pattern determined by the magnitude of said first named angle, a support member connected to the rotatable member and disposed radially outward from said spool with the outer end of said support member projecting longitudinally beyond the spool in the direction of mandrel advancement, and means for pivotally connecting the outer end portion of the distribution roller to said support member to selectively change the magnitude of said first angle and thereby vary the helix angle of the winding pattern.

21. A guide member for supporting and guiding a strip of material from a supply source onto a longitudinally advancing mandrel in a generally helical pattern to form a tubular article, comprising a rotatable shaft, a series of segments disposed in circular arrangement on the peripheral surface of the shaft and adapted to support the strip of material, means for slidably mounting said segments on said shaft to permit each of said segments to individually slide longitudinally of the rotating shaft as the strip moves over said segments and is wound on the advancing mandrel, and resilient means connected to each of said segments for returning each segment to its original position after the segment has moved out of contact with said strip.

22. The structure of claim 21, and including means for preventing rotation of said segments with respect to the shaft, and stop means for limiting the return of each segment to thereby locate the segment in position to be subsequently engaged by the strip as the shaft rotates.

23. In an apparatus for fabricating a tubular article, a longitudinally advancing mandrel, a support member having an annular strip supporting surface and having a central opening disposed coaxially of said surface to receive the advancing mandrel and said surface having at least one strip receiving discontinuity communicating with said central opening, an annular supporting surface supporting a strip of material in coiled form and the inner end of said strip extending through said discontinuity toward said mandrel, guide means disposed radially inward of said support member for guiding the inner end of said coiled strip onto said mandrel while said mandrel is advancing, means for maintaining the portion of the strip approaching said guide means in generally parallel relation to the portion of the strip passing from said guide means to said mandrel, and means for rotating said support member about the axis of the mandrel to thereby wind said strip on said mandrel in a helical pattern to form the tubular article.

24. The structure of claim 23 and including tensioning means for maintaining the strip in a taut condition as the same is wound on said mandrel.

25. A method of fabricating a tubular article, comprising advancing a mandrel longitudinally through the central openings in a series of spaced axially aligned coiled strips of reinforcing material impregnated with a partially cured solid resin, guiding an end of each strip onto the mandrel at spaced locations thereon, rotating each alternate coiled strip in the opposite direction to wind each alternate strip on the mandrel with the generally opposite helix angle to that of the intermediate strips in said series and thereby form said tubular article, heating each strip as it is applied to the mandrel to melt the resin, and curing the resin to an infusible state after the winding of all of said strips to form a strong integral structure.

26. A method of fabricating a tubular article, comprising advancing a mandrel longitudinally through the central opening in a coiled strip of substantially continuous fibers impregnated with a solid uncured resin binding material, attaching an end of the strip to the mandrel, rotating the coiled strip about the axis of the mandrel to thereby wind the strip on the mandrel in a generally helical pattern and form a tubular article, heating the strip as it is applied to mandrel to melt the resin and fully impregnate the fibers, supporting the mandrel for advancement at a position located substantially immediately adjacent, in the direction of mandrel advancement, of the position of application of the strip on said mandrel, and subsequently and separately heating the tubular article to completely cure the resin and provide an integral structure.

27. In a method of fabricating a reinforced plastic pipe, the steps of feeding a mandrel longitudinally through a winding unit, mounting a coil of tape on said winding unit in a coaxial relation to said mandrel, guiding an end of the tape over a guide member and onto said advancing mandrel, rotating said winding unit about the axis of the mandrel to thereby wind the tape on said mandrel in a generally helical pattern to form said pipe, and maintaining the portion of the tape passing from the coil to said guide member in a parallel relation to the portion of the tape passing from said guide member to said mandrel.

28. The method of claim 27 and including the step of applying tension to the tape as the same is wound on the mandrel.

29. A winding head for winding a strand of fibrous material onto a longitudinally advancing mandrel mounted coaxially with the winding head, comprising a hollow member having an opening adapted to receive the advancing mandrel, a rotatable member journaled about said hollow member for rotation about the axis thereof, drive means for rotating said rotatable member, a spool journaled for free rotation with respect to said rotatable member, said spool including an annular strand supporting surface disposed coaxially of said opening, said surface supporting a strand of fibrous reinforcing material in coiled form, said reinforcing material being impregnated with a solid partially lured thermosetting resin, guide means connected to said rotatable member for guiding the strand from the spool and winding the strand on the mandrel to form a tubular article, a tubular member spaced radially inward of said hollow member to provide a clearance therebetween, means for heating the strand wound on the mandrel to melt the resin, and means for flowing a cooling medium through said clearance to maintain the mandrel passing through said hollow member at a substantially uniform temperature.

30. An apparatus for fabricating a tubular reinforced plastic article, comprising a mandrel mounted for axial movement, a winding head mounted coaxially with said mandrel and including a rotatable support member and a spool with both said support member and spool having aligned axial openings to receive said mandrel, said spool supporting a strip of reinforcing material in coiled form, drive means for rotating said support member about the axis of said mandrel, means for mounting said spool for substantially free rotation about the axis of the mandrel whereby the strip of reinforcing material is drawn from the spool by rotation of said support member and wound on the mandrel in a generally helical pattern to form the tubular article, guide means associated with the rotatable support for guiding the strip of reinforcing material from the spool onto the mandrel, said guide means including a rotatable shaft and a series of segments disposed in circular arrangement on the peripheral surface of the shaft and adapted to support the strip of material, said guide means also including means for slidably mounting said segments on said shaft to permit each of said segments to individually slide longitudinally of the rotating shaft as the shaft moves over said segments and is wound on the advancing mandrel, and said guide means having resilient means connected to each of said segments for returning each segment to its original position after the segment has moved out of contact with said strip.

31. In an apparatus for fabricating a tubular article, a longitudinally advancing mandrel, a support member having an annular strand supporting surface and having a central opening to receive the advancing mandrel and disposed coaxially of said strand supporting surface, said supporting surface having at least one radially extending opening communicating with said central opening, said strand supporting surface supporting a strand of material in coiled form with the inner end of said strand extending through said radially extending opening toward said mandrel, guide means disposed radially inward of said support member for guiding the inner end of said coiled strand onto the mandrel while said mandrel is advancing, means for rotating said support member about the axis of the mandrel to thereby wind said strand on said mandrel in a helical pattern to form the tubular article, an outer casing disposed radially outward of said support member and serving to house the coiled strip, clamping means connected to the casing for securing the outer end of the coiled strip and preventing uncoiling thereof, and frictional resistance means engageable with said casing for preventing free rotation of said casing.

32. An apparatus for fabricating tubular reinforced plastic articles, comprising a spool having an annular strip supporting surface to support a coiled strip of generally unidirectional fibers coated with a solid uncured resin, said spool having an axial opening therein, a mandrel disposed within said opening and disposed coaxially of said strip supporting surface, means for winding the strip on the mandrel in a generally helical pattern to form a tubular article, means for heating the portion of the strip being wound on the mandrel to melt the resin and completely impregnate the fibers with the melted resin, and means separate from said last-named means for completely curing the resin to provide a strong rigid article.

References Cited in the file of this patent
UNITED STATES PATENTS

| | | |
|---|---|---|
| 1,932,942 | Thordarson | Oct. 31, 1933 |
| 2,173,859 | Piperoux | Sept. 26, 1939 |
| 2,351,692 | Miller | June 20, 1944 |
| 2,402,038 | Goldman et al. | June 11, 1946 |
| 2,449,526 | Dunne et al. | Sept. 14, 1948 |
| 2,489,503 | Sampson | Nov. 29, 1949 |
| 2,714,414 | De Ganahl et al. | Aug. 2, 1955 |
| 2,723,705 | Collins | Nov. 15, 1955 |
| 2,748,830 | Nash et al. | June 5, 1956 |
| 2,760,549 | Nash et al. | Aug. 28, 1956 |
| 2,766,160 | Bentov | Oct. 9, 1956 |
| 2,784,763 | Shorts | Mar. 12, 1957 |

UNITED STATES PATENT OFFICE
CERTIFICATE OF CORRECTION

Patent No. 3,128,216                 April 7, 1964

Daniel J. Reed

It is hereby certified that error appears in the above numbered patent requiring correction and that the said Letters Patent should read as corrected below.

Column 12, line 25, for "288" read -- 228 --; column 21, line 47, for "an" read -- said --; column 22, line 44, for "lured" read -- cured --.

Signed and sealed this 28th day of July 1964.

(SEAL)

Attest:

ESTON G. JOHNSON
Attesting Officer

EDWARD J. BRENNER
Commissioner of Patents